(12) United States Patent
Kodama et al.

(10) Patent No.: US 6,915,194 B2
(45) Date of Patent: Jul. 5, 2005

(54) VEHICLE STEERING CONTROL SYSTEM

(75) Inventors: Kazumasa Kodama, Toyota (JP); Masahiro Miyata, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 118 days.

(21) Appl. No.: 10/626,625

(22) Filed: Jul. 25, 2003

(65) Prior Publication Data

US 2004/0133323 A1 Jul. 8, 2004

(30) Foreign Application Priority Data

Jul. 26, 2002 (JP) ........................................ 2002-217731

(51) Int. Cl.$^7$ ................................................ B62D 5/99
(52) U.S. Cl. ............................ 701/41; 701/42; 701/43; 180/422; 180/445
(58) Field of Search ............................... 701/41, 42, 43; 180/402, 403, 408, 422, 421, 443, 445, 446

(56) References Cited

U.S. PATENT DOCUMENTS

| 3,939,938 | A | | 2/1976 | Inoue .......................... 180/422 |
| 5,506,776 | A | * | 4/1996 | Fushimi et al. ................ 701/41 |
| 6,490,514 | B2 | * | 12/2002 | Kurishige et al. ............. 701/41 |
| 6,594,568 | B2 | * | 7/2003 | Matsuoka ..................... 701/41 |

FOREIGN PATENT DOCUMENTS

| EP | 1 205 371 | 5/2002 |
| JP | 10-75598 | 3/1998 |
| JP | 11-334604 | 12/1999 |
| JP | 11-334628 | 12/1999 |
| WO | WO 00/48047 | 8/2000 |

OTHER PUBLICATIONS

Patent Abstracts of Japan, JP 11–041969, Feb. 12, 1999.
U.S. Appl. No. 10/626,591, filed Jul. 25, 2003, Kodama et al.
U.S. Appl. No. 10/626,611, filed Jul. 25, 2003, Kodama et al.
U.S. Appl. No. 10/626,625, filed Jul. 25, 2003, Kodama et al.
U.S. Appl. No. 10/626,626, filed Jul. 25, 2003, Kodama et al.

* cited by examiner

Primary Examiner—Tan Q. Nguyen
(74) Attorney, Agent, or Firm—Oblon, Spivak, McClelland, Maier & Neustadt, P.C.

(57) ABSTRACT

The terminal voltages of respective phase coils of a steering shaft driving motor constituted by a three-phase brushless motor are separately detected. When the terminal voltages detected at at least three different conducting terminals u, v, and w are made Vu, Vv, and Vw, respectively, and the values when those detected values Vu, Vv, and Vw are arranged in order from largest to smallest voltage are made $V_1$, $V_2$, and $V_3$, respectively, provided that $V_1 \geq V_2 \geq V_3$, a calculation is performed to determine if $V_1+V_3$ coincides with $2*V_2$ within a predetermined allowable range, and a failure is determined based on results obtained from such a calculation.

4 Claims, 18 Drawing Sheets

FIG.9

| VEHICLE SPEED (V) | V₁ | V₂ | V₃ | ...... | Vₙ |
|---|---|---|---|---|---|
| STEERING ANGLE CONVERSION RATIO (α) | α₁ | α₂ | α₃ | ...... | αₙ |

130

$\alpha = \theta / \phi$ $\phi$ : STEERING WHEEL SHAFT ANGULAR POSITION $\theta$ : STEERING SHAFT ANGULAR POSITION

FIG. 11

| Vs / Δθ | Vs₁ | Vs₂ | Vs₃ | Vs₄ | ... | Vsₙ |
|---|---|---|---|---|---|---|
| Δθ₁ | η₁₁ | η₁₂ | η₁₃ | η₁₄ | ... | η₁ₙ |
| Δθ₂ | η₂₁ | η₂₂ | η₂₃ | η₂₄ | ... | η₂ₙ |
| Δθ₃ | η₃₁ | η₃₂ | η₃₃ | η₃₄ | ... | η₃ₙ |
| Δθ₄ | η₄₁ | η₄₂ | η₄₃ | η₄₄ | ... | η₄ₙ |
| ⋮ | ⋮ | ⋮ | ⋮ | ⋮ | ⋮ | ⋮ |
| Δθₘ | ηₘ₁ | ηₘ₂ | ηₘ₃ | ηₘ₄ | ... | ηₘₙ |

131

$\eta$ : DUTY RATIO
$\Delta\theta = \theta' - \theta$ $\theta'$ : TARGET STEERING SHAFT ANGULAR POSITION
$\theta$ : CURRENT STEERING SHAFT ANGULAR POSITION

VEHICLE STEERING CONTROL SYSTEM

INCORPORATION BY REFERENCE

The disclosure of Japanese Patent Application No. 2002-217731 filed on Jul. 26, 2002 including the specification, drawings, and abstract is incorporated herein by reference in its entirety.

BACKGROUND OF THE INVENTION

1. Field of the Invention

The present invention relates to a steering control system of a vehicle such as an automobile.

2. Description of the Related Art

Recently, with regard to a steering system of a vehicle particularly of an automobile, the development has been conducted on a system that incorporates, as one way of further improving its functionality, a so-called variable steering angle conversion ratio mechanism that varies the conversion ratio (steering angle conversion ratio) of an operation angle of a steering wheel (steering wheel operation angle) to a wheel steering angle according to an operation state of the vehicle, without fixing the ratio of the steering wheel operation angle to the wheel steering angle to one to one. For example, the operation state of the vehicle may be represented by a vehicle speed. If the steering angle is prevented from abruptly increasing in response to an increase in the steering wheel operation angle by reducing the steering angle conversion ratio during high-speed operation, high-speed running of the vehicle can be stabilized. On the other hand, if the steering angle conversion ratio is increased during low-speed running, the number of turns of the steering wheel to the full lock position can be reduced. Accordingly, driving operation requiring a large steering angle such as parking a vehicle into a garage and parallel parking or pulling over the vehicle can be performed very easily.

A mechanism for varying the steering angle conversion ratio includes, as disclosed in Japanese Patent Laid-Open Publication No. 11-334604 for example, a type in which a steering wheel shaft is directly connected with a wheel steering shaft via a gear-driven transmission portion with variable gear ratio. However, the construction of this mechanism has a drawback that a gear ratio changing mechanism of the gear-driven transmission portion becomes complex. Therefore, a mechanism that rotates and drives the wheel steering shaft by a motor is suggested, for example, in Japanese Patent Laid-Open Publication No. 11-334628. Specifically, a final required wheel steering angle is calculated by computer processing based on the steering angle conversion ratio determined according to a steering wheel operation angle detected by an angle detecting portion and a vehicle operation status, and the wheel steering shaft which is mechanically disconnected from the steering wheel shaft is rotated and driven by the motor such that the calculated wheel steering angle can be obtained.

In such a steering control system, a rotation speed of a steering shaft driving motor is adjusted by PWM control based on a difference between an angular position of the wheel steering shaft (steering shaft angular position) and a target steering shaft angular position, so as to make the rotation of the wheel steering shaft follow the rotation of the steering wheel shaft. For instance, as the steering shaft angular position approaches toward the target angular position as the follow-up control proceeds, the rotation of the motor needs to be precisely controlled at low speed to avoid overshooting. On the other hand, in the case such as when the steering wheel is turned sharply, the motor for driving the wheel steering shaft is rotated at high speed such that the rotation of the wheel steering shaft keeps up with the operation of the steering wheel.

SUMMARY OF THE INVENTION

An induction motor generates a rotating magnetic field by sequentially switching multiple phase coils to be energized, and rotates and drives an armature. With regard to a DC motor, in addition to a type that switches a conducting phase by a brush, a brushless motor that switches the conducting phase by an electronic circuit control has been increasingly used recently as a steering control motor in terms of reliability and durability. In any case, a motor is important as a driving source of the steering shaft in this type of steering control system, and it is important to reliably monitor the occurrence of abnormalities.

An abnormality in a coil of the brushless motor is normally detected by detecting an abnormality in the current or voltage between terminals of respective phases (voltage between coils). However, both methods have disadvantages in that the measurement of the voltage between the terminals requires a complicated circuit including a differential amplifier circuit, and an accuracy can not be secured in the case of current detection due to an effect of flyback current.

Therefore, a method of detecting an abnormality of a coil by detecting voltage at a neutral point of phase coils in star-connection is disclosed in Japanese Patent Laid-Open Publication No. 10-75598. The neutral point voltage can be measured easily, for example, on the basis of the ground level. Thus, the construction of a measuring circuit is simple, and an abnormality can be determined easily by comparing with the reference voltage. However, since the neutral point is formed at connecting points of the coils in the motor, there exists a problem that a measuring terminal can not be taken out easily. In this case, it is troublesome and involves high cost to additionally provide a measuring terminal in the motor for measuring the neutral point voltage.

It is an object of the present invention to provide a vehicle steering control system that does not need modification of providing a measuring terminal in the steering shaft driving motor, and the like, and can determine a failure of the motor with a simple measuring circuit configuration.

To achieve the aforementioned object, a vehicle steering control system of the present invention determines a steering angle to be applied to a wheel steering shaft based on an operation angle to be applied to a steering wheel shaft and a vehicle operation status, and rotates and drives the wheel steering shaft by a steering shaft driving motor constituted by a three-phase brushless motor so as to obtain the determined steering angle. This system includes a steering wheel shaft angle detecting portion for detecting an angular position of the steering wheel shaft (steering wheel shaft angular position), a steering shaft angle detecting portion for detecting an angular position of the wheel steering shaft (steering shaft angular position), and an operation status detecting portion for detecting an operation status of the vehicle. Furthermore, this system has an steering control portion that determines a target angular position of the wheel steering shaft based on the detected steering wheel shaft angular position and the detected vehicle operation status, and controls a rotation speed of the steering shaft driving motor by PWM control based on a difference between the steering shaft angular position and the target angular position so as to control the operation of the steering shaft driving motor such that the steering shaft angular position approaches toward the target angular position. In the PMW control, switching is not performed in a state in which a first terminal is connected to a first pole of a DC power supply, and switching is performed in a state in which a second terminal is connected to a second pole of the DC power supply, wherein one of the conducting terminals of a pair of two phase coils in the steering shaft driving motor that are simultaneously energized is made the first terminal, while the other conducting terminal is made the second terminal. The vehicle steering control system also includes terminal voltage detecting means for separately detecting terminal voltage of each phase coil in the steering shaft driving motor, and failure determining means for determining a failure based on results obtained from calculating whether $V_1+V_3$ coincides with $2*V_2$ within a predetermined allowable range. In this case, the detected values of the terminal voltages of three phase conducting terminals u, v, and w in the steering shaft driving motor are made Vu, Vv, and Vw, respectively, and furthermore, the values when those detected values Vu, Vv, and Vw are arranged in order from largest to smallest voltage are made $V_1$, $V_2$, $V_3$, respectively (provided that $V_1 \geq V_2 \geq V_3$).

In the present invention, the steering shaft driving motor is controlled by a PWM method as follows. One of the conducting terminals of a pair of two phase coils in the steering shaft driving motor that are simultaneously energized is made a first terminal while the other conducting terminal is made a second terminal, and switching is not performed in a state in which the first terminal is connected to a first pole of a DC power supply, and switching is performed in a state in which the second terminal is connected to a second pole of the DC power supply. This control method switches on and off the power supply voltage application based on a predetermined duty ratio while energizing both coils in the same polarity, and has advantages in that it is not susceptible to an effect of shut-off delay resulted from a junction capacitance of a semiconductor switching device and an effect of the dead time caused thereby, and that a favorable linearity can be obtained in the motor characteristics. The detected values of the terminal voltages of the three phase conducting terminals u, v, and w are made Vu, Vv, and Vw, respectively. In addition, the values when those detected values Vu, Vv, Vw are arranged in order from largest to smallest voltage are made $V_1$, $V_2$, and $V_3$, respectively (provided that $V_1 \geq V_2 \geq V_3$). In this case, if the motor is in a normal condition, the following mathematical relationship is always established:

$$(V_1+V_3)/2 = V_2 \quad (A)$$

Although $(V_1+V_3)/2$ rarely coincides completely with $V_2$ due to various error factors, if a certain allowable range is set, $(V_1+V_3)/2$ and $V_2$ may approximately coincide with each other. Therefore, the failure determining means can extremely easily determine a failure based on results obtained from calculating whether $V_1+V_3$ coincides with $2*V_2$ within a predetermined allowable range.

In the present invention, to determine a failure of the steering shaft driving motor constituted by a three-phase brushless motor, the terminal voltages at different conducting terminals of three phases or more, not the voltage between terminals in the motor, are separately detected to perform a predetermined failure determination process using those detected voltages. The conducting terminals of the motor are exposed outside a housing of the motor for power supply. These individual terminal voltages can be measured with extreme ease by merely connecting a voltage measuring line to the conducting terminals and inputting voltages to a voltage measuring portion. That is, there is no need for modification of providing a measuring terminal in the motor, and the like, as is required in the method of measuring a neutral point voltage as described above. Furthermore, when the motor is operating normally, respective terminal voltages are associated by the mathematical relationship (A). For example, according to a conventional method that uses voltage between terminals, only the information of a voltage difference between conducting terminals is given, and thus, a mathematical relationship between terminal voltages to be satisfied under a normal condition must be determined using only the voltage difference as a parameter. However, it is generally difficult or not possible to determine such a relationship, or even if possible, it often requires complicated processing. Nevertheless, since respective terminal voltages are detected separately in the present invention, whether the mathematical relationship (A) that must be satisfied under the normal condition is established between the terminal voltages can be determined by a very simple algorithm.

Furthermore, a conducting phase in the three-phase brushless motor is sequentially switched based on time for generation of a rotating magnetic field. On the other hand, the relationship (A) established between the terminal voltages in a normal operating condition is described in different forms because the largest-to-smallest order of the detected values Vu, Vv, and Vw of the terminal voltages differs according to the types of the conducting phase. Accordingly, it apparently seems reasonable to identify a conducting phase, and then select a mathematical relationship that corresponds to the conducting phase to perform a failure determination process using the selected relationship. However, a considerable number of steps is required to perform a series of processes from a conducting phase identification and a terminal voltage detection to a failure determination calculation by computer processing. Particularly, if the terminal voltage detection is not performed as soon as possible after the conducting phase is identified, energization is switched to the next phase during measurement of the terminal voltage. Thus, the identified conducting phase will not correspond with the detected value of the terminal voltage in time relation, thereby disabling a failure determination. Therefore, a real-time process that guarantees a corresponding relationship between the conducting phase and the detected value of the terminal voltage in time relation is necessary, requiring the use of a computer (CPU) that is capable of high-speed processing.

However, if the frequency of motor failure occurrence is considered, detection (sampling) of terminal voltage needs not be conducted so frequently as a matter of reality. Thus, when the sum of any two values selected from the detected values Vu, Vv, and Vw of the terminal voltages is made Vm, and the remaining value is made Vr, the failure determining means may be constructed to perform a calculation to determine whether Vm coincides with $2*Vr$ within a predetermined range while changing the combinations of the two detected values selected to calculate Vm. Then, if a calculation result in which Vm coincides with $2*Vr$ can not be obtained, a failure of the steering shaft driving motor is determined.

The main points of the aforementioned method are as explained below. That is, the identification of a conducting phase is deliberately not performed, and only the terminal voltage of each phase is sampled. Then, by utilizing time that can be secured before the start of next sampling for failure determination, various conducting phases during sampling are assumed for each combination of the detected values of terminal voltages obtained, and a calculation is performed by applying, one after another, the combinations of the detected terminal voltages to the determination calculation patterns that correspond to respective conducting phases. Based on results obtained therefrom, a failure is determined. In this process, any one of the assumed conducting phases must have been established during sampling of the terminal voltages, and if the motor is in a normal condition, a positive (with respect to "normal") determination calculation result must be obtained in the determination calculation pattern corresponding to the established conducting phase. On the contrary, in the determination calculation pattern corresponding to the conducting phase that has not been established, a negative determination calculation result is obtained. On the other hand, if a failure has occurred, the negative determination calculation result is also obtained in the determination calculation pattern corresponding to the established conducting phase. Accordingly, a failure can be determined by identifying which of the aforementioned conditions is established. In any case, this method allows a failure to be determined without identifying the conducting phase, and therefore, a failure determination can be performed without any problem even if a non-high-performance multipurpose CPU is used, thereby allowing the low-cost construction of the system.

Next, the vehicle steering control system of the present invention can adopt a construction in which the steering wheel shaft is mechanically disconnected from the wheel steering shaft. In this case, in order to directly transmit a manual operation force applied to the steering wheel shaft to the wheel steering shaft, a lock mechanism that can be switched between a lock state in which both shafts are connected and locked in an integrally rotatable manner, and an unlock state in which the locking and connection of the two shafts are released may be provided. With this arrangement, when the expected steering control is disabled due to system troubles, manual steering by the steering wheel becomes possible by connecting and locking the steering wheel shaft and the wheel steering shaft. Consequently, the vehicle operation can be continuously performed without further problem.

For example, the system may be provided with lock control means that sets the lock mechanism in the lock state and stops the steering shaft driving motor when a fault determination result is received from the failure determining means. If the steering shaft driving motor breaks down, repairing is required. In this case, if the steering can not be controlled at all, external transportation means such as a towing car must be used to take the vehicle to a repair shop, thereby causing inconvenience. Therefore, if the construction is made to allow manual steering using the steering wheel by connecting and locking the steering wheel shaft and the wheel steering shaft, the minimum required driving functions are secured, and thus, for example, the vehicle can be brought to the repair shop without depending on other transportation means.

BRIEF DESCRIPTION OF THE DRAWINGS

FIG. 9 is a schematic table which offers a relationship between a steering angle conversion ratio and a vehicle speed;

FIG. 11 is a schematic two-dimensional table for determining a duty ratio based on a motor power supply voltage and an angle difference $\Delta \theta$;

DETAILED DESCRIPTION OF THE PREFERRED EMBODIMENTS

An embodiment of the present invention will be described hereinafter with reference to the accompanying drawings.

Figure 1:
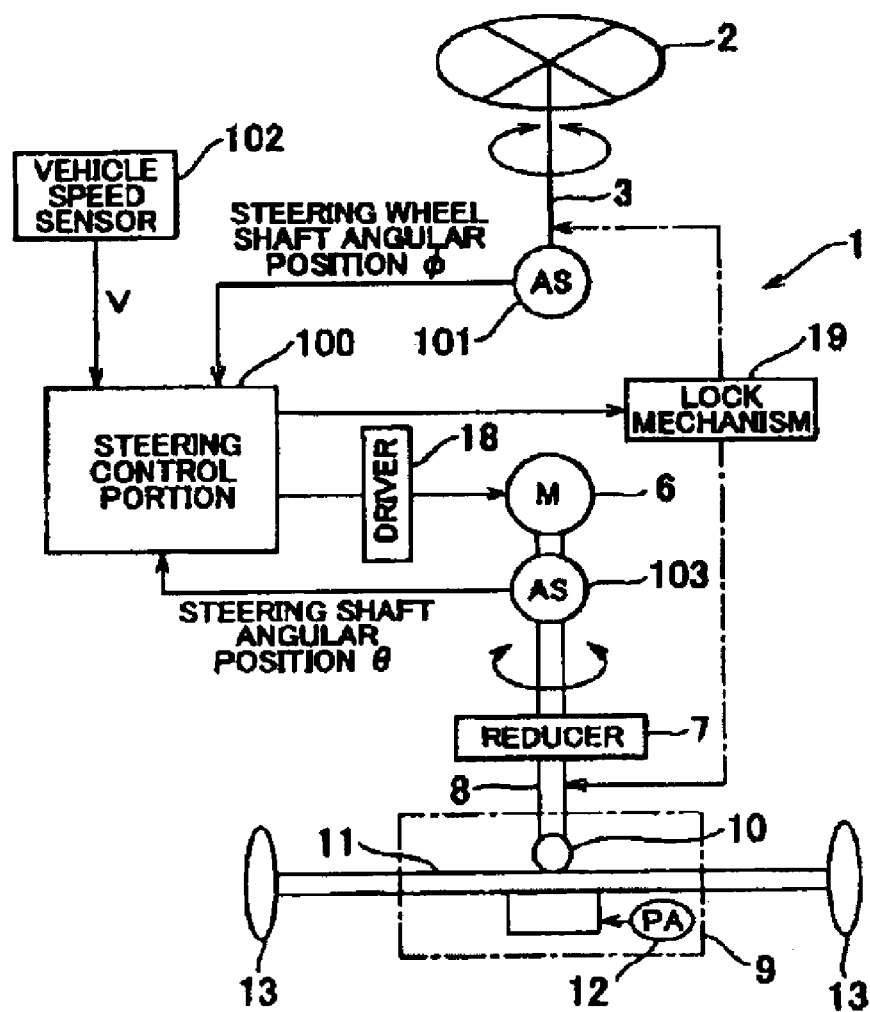
FIG. 1 is a schematic diagram of the overall construction of a vehicle steering control system of the present invention.

FIG. 1 is a schematic diagram showing an example of the overall construction of a vehicle steering control system to which the present invention is applied. ("Vehicle" in this embodiment refers to an automobile, however, the applicable scope of the present invention is not limited to this.) A vehicle steering control system 1 has a construction in which a steering wheel shaft 3 directly connected with a steering wheel 2 is mechanically disconnected from a wheel steering shaft 8. The wheel steering shaft 8 is rotated and driven by a motor 6 which acts as an actuator. An end of the wheel steering shaft 8 extends into a steering gear box 9, and a pinion 10 which rotates together with the wheel steering shaft 8 reciprocates a rack bar 11 in an axial direction, thereby changing a steering angle of wheels 13 and 13. Furthermore, the vehicle steering control system 1 according to the present embodiment adopts a power steering that supports driving of the reciprocating motion of the rack bar 11 by a power assist mechanism 12 of a well-known hydraulic, electrical, or electrohydraulic type.

An angular position ø of the steering wheel shaft 3 (hereinafter called the steering wheel shaft angular position) is detected by a steering wheel shaft angle detecting portion 101 consisting of a well-known angle detecting portion such as a rotary encoder. On the other hand, an angular position θ of the wheel steering shaft 8 (hereinafter called the steering shaft angular position) is detected by a steering shaft angle detecting portion 103 also consisting of an angle detecting portion such as a rotary encoder. Furthermore, in the present embodiment, a vehicle speed detecting portion (vehicle speed sensor) 102 for detecting a vehicle speed V is provided as an operation status detecting portion that detects an operation status of an automobile. The vehicle speed detecting portion 102 is constituted, for example, by a rotation detecting portion (such as a rotary encoder and a tachogenerator) for detecting rotation of the wheel 13. A steering control portion 100 determines a target angular position θ' of the wheel steering shaft 8 based on the detected angular position ø of the steering wheel shaft 3 and the vehicle speed V, and controls the operation of the motor 6 via a motor driver 18 such that the angular position θ of the wheel steering shaft 8 approaches toward the target angular position θ'.

Moreover, a lock mechanism 19 is provided between the steering wheel shaft 3 and the wheel steering shaft 8. This mechanism can be switched between a lock state in which both shafts are connected and locked in an integrally rotatable manner, and an unlock state in which the locking and connection of the two shafts are released. In the lock state, a rotation angle of the steering wheel shaft 3 is transmitted to the wheel steering shaft 8 without being converted (that is, a steering angle conversion ratio is one to one), thereby allowing manual steering. The lock mechanism 19 is switched into the lock state based on a command from the steering control portion 100 at the time of abnormality occurrence and the like.

Figure 2:
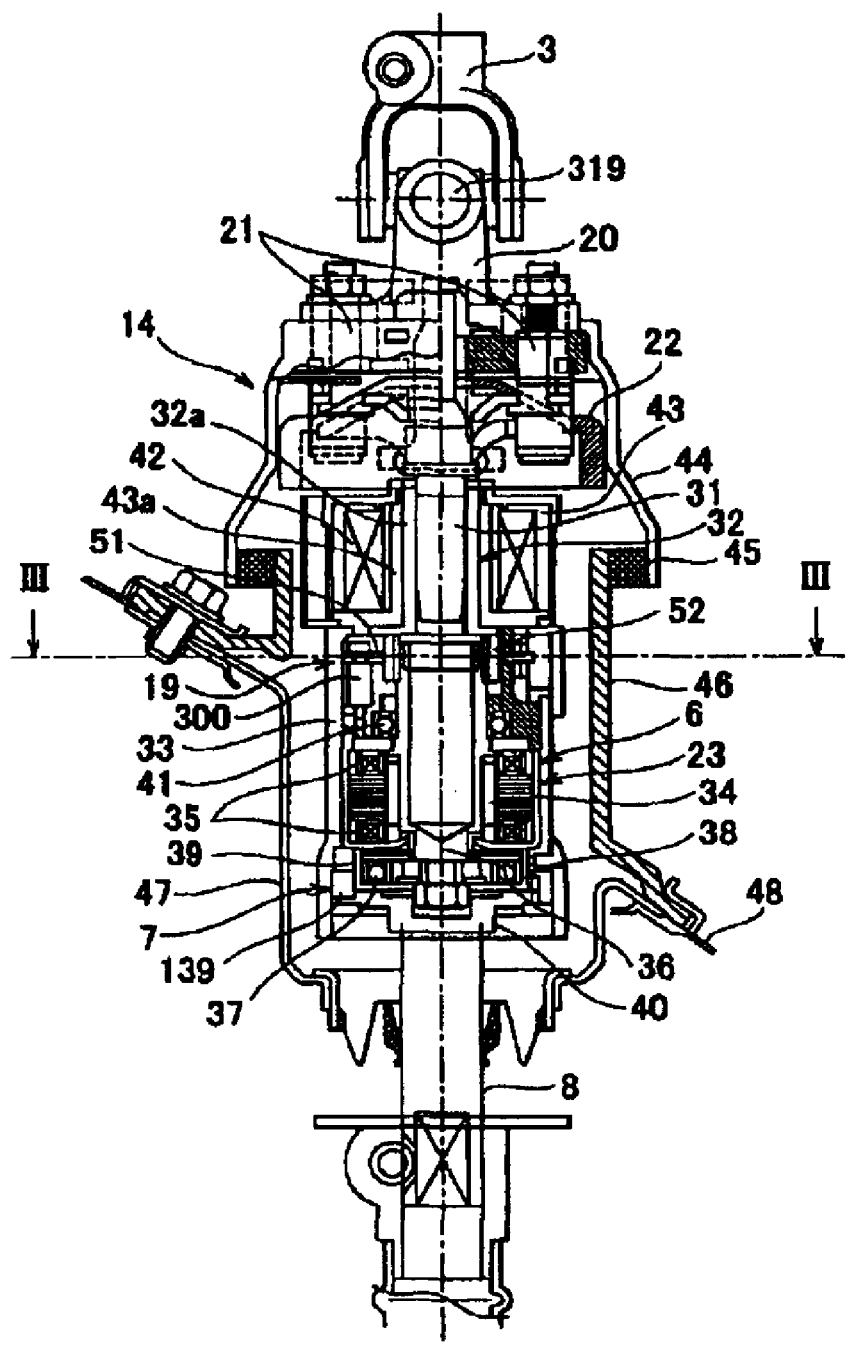
FIG. 2 is a longitudinal cross-sectional view showing an example of a driving portion unit.

FIG. 2 is an example of the construction of the driving portion unit of the wheel steering shaft 8 driven by the motor 6 in an on-vehicle condition. In a driving portion unit 14, a motor case 33 rotates integrally with the motor 6 assembled therein if the steering wheel shaft 3 is turned by operation of the steering wheel 2 (FIG. 1). In the present embodiment, the steering wheel shaft 3 is coupled with an input shaft 20 via a universal joint 319, and the input shaft 20 is connected with a first coupling member 22 via bolts 21 and 21. The first coupling member 22 is integrated with a pin 31. Furthermore, the pin 31 is engaged and fitted in a sleeve 32a that extends to the rear from the center of one plate face of a second coupling member 32. On the other hand, the cylindrical motor case 33 is integrated to the other plate face of the second coupling member 32. A cover 44 is made of rubber or resin, and rotates integrally with the steering wheel shaft 3. In addition, a case 46 houses the driving portion unit 14 integrated with a cockpit panel 48, and a seal ring 45 seals between the cover 44 and the case 46.

Figure 3:
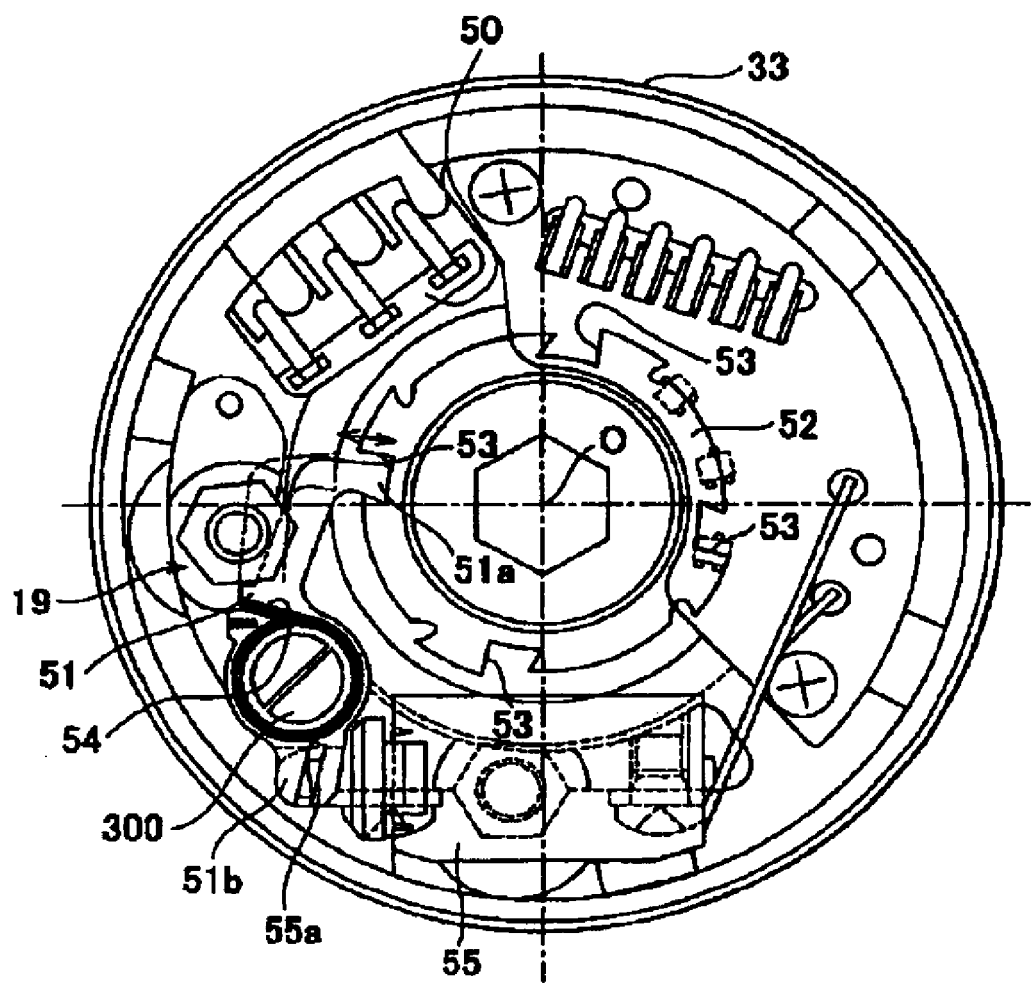
FIG. 3 is a cross-sectional view taken along line III—III in FIG. 2.

A stator portion 23 of the motor 6 including coils 35 and 35 is integrally assembled to the inner side of the motor case 33. A motor output shaft 36 is rotatably assembled to the inner side of the stator portion 23 via a bearing 41. Furthermore, an outer peripheral face of the motor output shaft 36 is integrated with an armature 34 consisting of a permanent magnet, and the coils 35 and 35 are disposed so as to surround the armature 34. In addition, feeder terminals 50 are taken out from the coils 35 and 35 such that the terminals are arranged side by side on a rear end face of the motor case 33, as shown in FIG. 3 (a cross-sectional view taken along line III—III in FIG. 2), and the coils 35 and 35 are supplied with electricity at the feeder terminals 50 through a feeder cable 42.

As will be explained below, the motor 6 in the present embodiment is a brushless motor, and the feeder cable 42 is constructed as a bundle cable that bundles wires for supplying electricity separately to respective phase coils 35 and 35 of the brushless motor. A cable case 43 including a hub 43a is provided adjacent to the rear end side of the motor case 33, and the feeder cable 42 is accommodated therein in a state spirally coiled around the hub 43a. One end of the feeder cable 42 that is not connected to the feeder terminals 50 is fixed to the hub 43a of the cable case 43. When the steering wheel shaft 3 is rotated in a forward or reverse direction along with the motor case 33 and thus the feeder terminals 50, the feeder cable 42 in the cable case 43 functions to absorb rotation of the motor case 33 by being coiled or uncoiled with respect to the hub 43a.

Rotation of the motor output shaft 36 is transmitted to the wheel steering shaft 8 after being reduced to a predetermined ratio (for example, 1/50) via a reduction mechanism 7. The reduction mechanism 7 in the present embodiment is constructed of a harmonic drive reducer. That is, the motor output shaft 36 is integrated with an ellipsoidal inner race bearing 37, and a deformable, thin external gear 38 is fitted to the outer side thereof. Furthermore, the outer side of the external gear 38 is engaged with internal gears 39 and 139 integrated with the wheel steering shaft 8 via a coupling 40. The internal gears 39 and 139 consist of an internal gear (hereinafter also called a first internal gear) 39 and an internal gear (hereinafter also called a second internal gear) 139 that are coaxially disposed. The first internal gear 39 is fixed to the motor case 33 to be rotated integrally with the motor case 33, whereas the second internal gear 139 is not fixed to the motor case 33 and is relatively rotatable with respect to the motor case 33. The difference in the number of teeth of the first internal gear 39 and the engaging external gear 38 is zero, and thus, a relative rotation with respect to the external gear 38 is not caused (that is, it can also be said that the first internal gear 39 and thus the motor case 33 and the steering wheel shaft 3 are connected with the rotating motor output shaft 36 in a freely-rotatable manner). On the contrary, the second internal gear 139 has more teeth than the external gear 38 (for example, by 2). If the number of teeth of the internal gear 139 is made N, and the difference in the number of the teeth of the external gear 38 and the internal gear 139 is made n, the rotation of the motor output shaft 36 is reduced to n/N to be transmitted to the wheel steering shaft 8. Meanwhile, in the present embodiment, the input shaft 20 of the steering wheel shaft 3, the motor output shaft 36, and the wheel steering shaft 8 are arranged coaxially to achieve a compact structure.

Next, the lock mechanism 19 includes a lock member 51 fixed to a lock base portion side (the motor case 33 in the present embodiment) that is incapable of rotating relatively with respect to the steering wheel shaft 3, and a lock-receiving member 52 provided on a lock-receiving base portion (the motor output shaft 36 side in the present embodiment). As shown in FIG. 3, the lock member 51 is provided so as to be capable of moving between a lock position for engaging with a lock-receiving portion 53 formed on the lock-receiving member 52, and an unlock position for disengaging from the lock-receiving portion 53. In this embodiment, a plurality of the lock-receiving portions 53 are formed at certain intervals in a circumferential direction of the lock-receiving portion 52 that rotates integrally with the motor output shaft 36. A lock portion 51a provided at an end of the lock member 51 selectively engages with any one of the plurality of the lock-receiving portions 53 according to a rotation angle phase of the motor output shaft 36. The steering wheel shaft 3 is non-rotatably connected with the motor case 33 (by the coupling 22 and the pin in this embodiment). When the lock member 51 and the lock-receiving member 52 are disengaged (unlock state), the motor output shaft 36 rotates with respect to the motor case 33, and such rotation is transmitted to each of the first internal gear 39 and the second internal gear 139 via the external gear 38. Since the first internal gear 39 fixed to the motor case 33 does not rotate relatively with respect to the external gear 38 as described above, the first internal gear 39 rotates at the same speed as the steering wheel shaft 3 (that is, the first internal gear 39 rotates following the steering wheel operation). Furthermore, the second internal gear 139 reduces and transmits the rotation of the motor output shaft 36 to the wheel steering shaft 8 to rotate and drive the wheel steering shaft 8. On the contrary, when the lock member 51 and the lock-receiving member 52 are engaged in a lock state, the motor output shaft 36 becomes incapable of rotating relatively with respect to the motor case 33. In addition, of the internal gears 39 and 139 of the reduction mechanism 7, since the first internal gear 39 is fixed to the motor case 33, the rotation of the steering wheel shaft 3 is directly transmitted to the first internal gear 39, the external gear 38, the second internal gear 139 and the wheel steering shaft in that order.

Moreover, in the present embodiment, the lock-receiving member 52 is assembled to an outer peripheral face of one end of the motor output shaft 36, and each lock-receiving portion 53 is formed in a recessed shape that is notched in a radial direction on an outer peripheral face of the lock-receiving member 52. Furthermore, as shown in FIG. 2, the lock member 51 is assembled rotatably around an axial line, that is substantially parallel to the wheel steering shaft 8, of a rotating base 300 provided in the motor case 33. Furthermore, an elastic member 54 for elastically returning the lock member 51 to an original position when a solenoid 55 is de-energized is provided. By energizing and de-energizing the solenoid 55, the lock portion 51a formed at the end of the lock member 51 moves toward and away from the lock-receiving member 52 for locking and unlocking as mentioned earlier via a protruding portion 55a provided at an end of the solenoid 55 and a slot portion formed on a rear end portion 51b of the lock member 51. In this case, it is possible to select whether the lock state or the unlock state is established during energization of the solenoid 55. However, in the present embodiment, it is set such that the unlock state is established when the solenoid 55 is energized. Accordingly, when the solenoid 55 is de-energized at the time of power cut-off and the like, the lock state is established by the operation of an elastic member 54, thus allowing manual steering.

Figure 4:
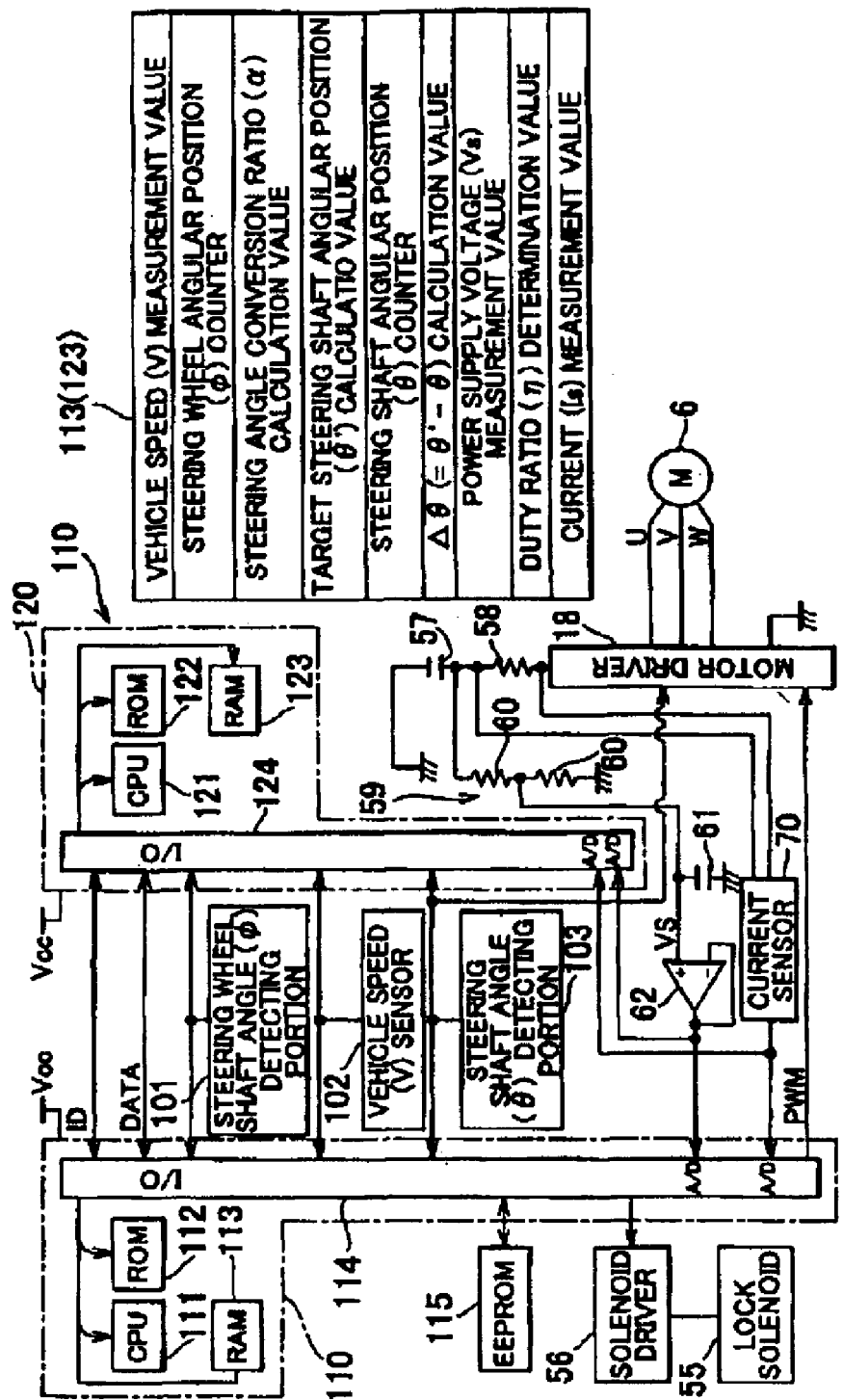
FIG. 4 is a block diagram showing an example of an electrical configuration according to an embodiment of the vehicle steering control system of the present invention.

FIG. 4 is a block diagram showing an example of the electrical configuration of the steering control portion 100. Two microcomputers 110 and 120 constitute substantial parts of the steering control portion 100. A main microcomputer 110 includes a main CPU 111, a ROM 112 storing a control program, a main CPU-side RAM 113 which serves as a work area of the CPU 111, and an input-output interface 114. Furthermore, a sub-microcomputer 120 includes a sub-CPU 121, a ROM 122 storing a control program, a sub-CPU-side RAM 123 which serves as a work area of the sub-CPU 121, and an input-output interface 124. Operation of the motor 6 (actuator) that drives the wheel steering shaft 8 is directly controlled by the main microcomputer 110. The sub-microcomputer 120 performs data processing required for the operation control of the motor 6, such as calculating necessary parameters, in parallel with the main microcomputer 110, and communicates results of data processing with the main microcomputer 110, thereby functioning as an auxiliary control portion for monitoring and checking the normal operation of the main microcomputer 110, and providing supplement information as necessary. In this embodiment, data communication between the main microcomputer 110 and the sub-microcomputer 120 is effected by communication between the input-output interfaces 114 and 124. In this case, both microcomputers 110 and 120 are applied with a power supply voltage Vcc (for example, +5V) from a stabilized power supply (not shown) even after the automobile operation is completed (that is, after ignition is turned off), such that the memory in the RAMs 113 and 123 or an EEPROM 115 (to be explained below) is saved.

Each output from a steering wheel shaft angle detecting portion 101, a vehicle speed detecting portion 102, and a steering shaft angle detecting portion 103 is distributed and input to the input-output interfaces 114 and 124 of the main microcomputer 110 and the sub-microcomputer 120, respectively. In the present embodiment, each of the detecting portions is constituted by a rotary encoder, and count signals from the encoder are directly input to a digital data port of the input-output interfaces 114 and 124 through a Schmitt trigger portion (not shown). Furthermore, the input-output interface 114 of the main microcomputer 110 is connected with the solenoid 55 that constitutes a driving portion of the lock mechanism 19, via a solenoid driver 56.

The motor 6 is constituted by a three-phase brushless motor, and a rotation speed thereof is adjusted by PWM control. Furthermore, the motor driver 18 is connected with an on-board battery 57 which acts as the power supply of the motor 6. A voltage (power supply voltage) Vs of the battery 57 received by the motor driver 18 changes (for example, in the range of 9V to 14V) according to a condition of load distribution to each portion of the vehicle or a power generation condition of an alternator. In the present embodiment, the battery voltage Vs that varies as described above is directly used as the motor power supply voltage without intervention of a stabilized power supply circuit. Since the steering control portion 100 controls the motor 6 on the premise that the power supply voltage Vs that varies in a certain range as explained above is used, a detecting portion for detecting the power supply voltage Vs is provided. According to this embodiment, a branch path for voltage detection is provided at a section of a conducting path leading to the motor 6 (immediately before the driver 18), and a voltage detection signal is obtained from via voltage-dividing resistors 60 and 60 provided in the branch path. After the voltage detection signal is smoothed by a capacitor 61, the signal is input to input ports with A/D conversion function (hereinafter called the A/D ports) of the input-output interfaces 114 and 124 through a voltage follower 62.

Figure 6:
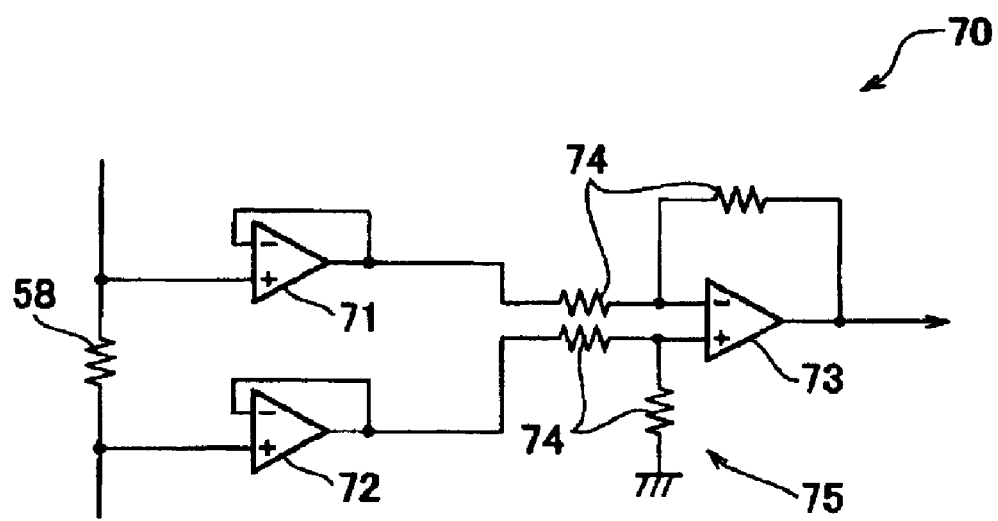
FIG. 6 is a diagram showing an example of a current sensor circuit.

Moreover, a current detecting portion is provided in the conducting path leading to the motor 6 to monitor an energization state of the motor 6 such as presence of overcurrent conditions and the like. Specifically, a voltage difference between both ends of a shunt resistor (current detection resistor) 58 provided in the conducting path is detected by a current sensor 70, and is input to the A/D ports of the input-output interfaces 114 and 124. The current sensor 70, as shown in FIG. 6 for instance, detects the voltage at both ends of the shunt resistor 58 via the voltage followers 71 and 72, and amplifies the voltage in a differential amplifier 75 consisting of an operational amplifier 73 and peripheral resistors 74 for output. The output from the differential amplifier 75 is proportional to a value of the current flowing through the shunt resistor 58, and thus can be used as a detected current value Is. In this case, in addition to the shunt resistor, a probe such as a hall element and a current detecting coil for detecting the current based on the electromagnetic principle may be used.

Referring back to FIG. 4, the following memory areas are provided in the RAMs 113 and 123 of both microcomputers 110 and 120, respectively.

(1) Vehicle speed (V) measurement value memory: This memory stores a measured value of the current vehicle speed V from the vehicle speed sensor 102.
(2) Steering wheel shaft angular position (ø) counter memory: This memory counts the count signals from the rotary encoder that constitutes the steering wheel shaft angular position detecting portion 101, and stores the count value representing the steering wheel shaft angular position ø. In this case, the rotary encoder of which a direction of rotation is identifiable is used. The counter is incremented in the case of forward rotation, and decremented in the case of reverse rotation.
(3) Steering angle conversion ratio (α) calculation value memory: This memory stores a steering angle conversion ratio α calculated based on the detected vehicle speed value.
(4) Target steering shaft angular position (θ') calculation value memory: This memory stores a target value of the steering shaft angular position, that is a value of the target steering shaft angular position θ', calculated from the values of the current steering wheel shaft angular position ø and the steering angle conversion ratio α by, for example, multiplying ø by α.
(5) Steering shaft angular position (θ) counter memory: This memory counts the count signals from the rotary encoder that constitutes the steering shaft angle detecting portion 103, and stores the count value representing the steering shaft angular position θ.
(6) Δθ calculation value memory: This memory stores a calculated value of the difference Δθ (=θ'−θ) between the target steering shaft angular position θ' and the current steering shaft angular position θ.
(7) Power supply voltage (Vs) detection value memory: This memory stores a detected value of the power supply voltage Vs of the motor 6.
(8) Duty ratio (η) determination value memory: This memory stores a duty ratio η that is used in energization of the motor 6 by PWM, determined based on Δθ and the power supply voltage Vs.
(9) Current (Is) detection value memory: This memory stores a detected value of the current Is detected by the current sensor 70.

Meanwhile, the main microcomputer 110 as explained above functions as motor operation limiting means by the control program stored in the ROM 112 (the sub-microcomputer 120 also performs the same process for monitoring the main microcomputer by the control program stored in the ROM 122). Specifically, when an abnormality determination result detected by the current sensor 70 is received, an energization state of the lock solenoid 55 of the lock mechanism 19 is switched, and the steering wheel shaft 3 and the wheel steering shaft 8 are connected and locked to stop the motor 6.

Furthermore, the input-output interface 114 of the main microcomputer 110 is provided with the EEPROM 115 as a second storage portion for storing the angular position of the wheel steering shaft 8 upon completion of vehicle operation (i.e., when ignition is turned off), that is a completion angular position. The EEPROM 115 (PROM) allows data reading by the main CPU 111 at a first operating voltage (+5V) at which the main CPU 111 performs reading and writing of data against the main CPU-side RAM 113, and, on the other hand, allows data writing by the main CPU 111 by setting a second operating voltage (a higher voltage than the first operating voltage is adopted in the present embodiment: e.g. +7V) that is different from the first operating voltage (+5V). Therefore, data content will not be rewritten even in the case of runaway of the main CPU 111. The second operating voltage is generated by a booster circuit (not shown) provided between the EEPROM 115 and the input-output interface 114.

The operation of the vehicle steering control system 1 will be described hereinafter.

Figure 12:
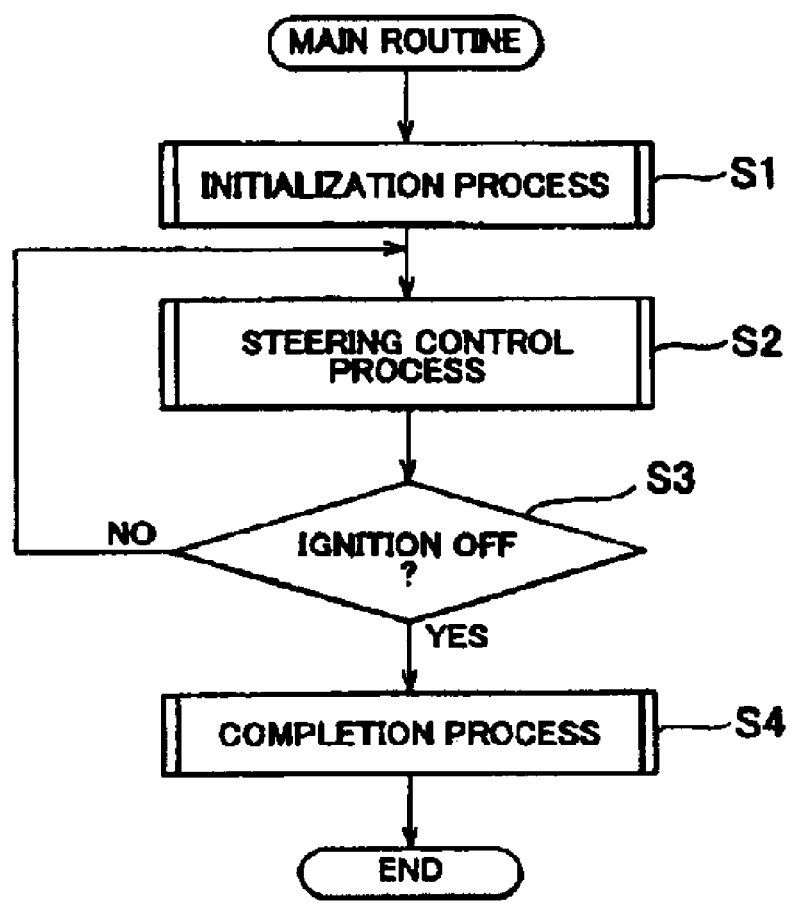
FIG. 12 is a flowchart showing an example of the main routine of a computer process in the vehicle steering control system of the present invention.

FIG. 12 illustrates the flow of a main routine process of the control program executed by the main microcomputer 10. An initialization process is performed in S1, in which a completion angular position (to be explained below) of the wheel steering shaft 8 written in the EEPROM 115 in the last completion process when ignition was turned off is read, and the completion angular position is set as an initial angular position of the wheel steering shaft 8 at the start of the processing. To be specific, a counter value representing the completion angular position is set in the steering shaft angular position counter memory mentioned above. In this case, a flag indicating completion of data writing in the EEPROM 115 to be described later is cleared at this point.

Figure 10:
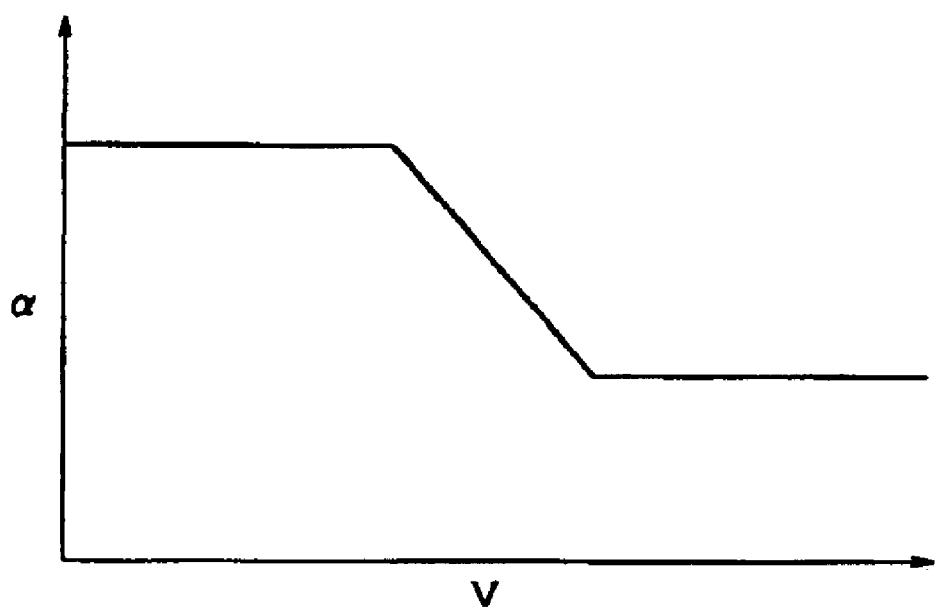
FIG. 10 is a schematic diagram showing an example of a pattern for changing the steering angle conversion ratio according to the vehicle speed.

Upon completion of the initialization process, the process proceeds to S2 for a steering control process. The steering control process is executed repeatedly at certain intervals (for example, several hundred μs) so as to equalize parameter sampling intervals. Details thereof will be explained referring to FIG. 13. In S201, a measured value of the current vehicle speed V is read, and a steering wheel shaft angular position ø is then read in S202. Next, in S203, a steering angle conversion ratio α for converting the steering wheel shaft angular position ø into the target steering shaft angular position θ' is determined based on the calculated value of the vehicle speed V. The steering angle conversion ratio α is set to different values according to the vehicle speed V. Specifically, as shown in FIG. 10, the steering angle conversion ratio α is set to a smaller value when the vehicle speed V is equal to or higher than a certain speed, whereas the steering angle conversion ratio α is set to a larger value during low-speed running in which the vehicle speed V is lower than the certain speed. In this embodiment, a table 130 that offers the setting values of the steering angle conversion ratio α corresponding to various vehicle speeds V as shown in FIG. 9, is stored in the ROM 112 (122), and the steering angle conversion ratio a corresponding to the current vehicle speed V is calculated by interpolation with reference to the table 130. In the present embodiment, the vehicle speed V is used as information that indicates the vehicle operation status. However, in addition to this, a lateral pressure to which the vehicle is subjected, a slope angle of the road surface, and the like may be detected by a sensor as information indicating the vehicle operation status, and the steering angle conversion ratio α can be set to a specific value according to such a detected value. Furthermore, it is also possible to determine a basic value for the steering angle conversion ratio α according to the vehicle speed V, and use the basic value by correcting that value based on the information other than the vehicle speed as mentioned above as required.

In S204, the target steering shaft angular position θ' is calculated by multiplying the detected steering wheel shaft angular position ø by the determined steering angle conversion ratio α. Then, the current steering shaft angular position θ is read in S205. In S206, a difference Δθ (=θ'−θ) between the current steering shaft angular position θ obtained from the steering shaft angular position counter and the target steering shaft angular position θ' is calculated. Next, in S207, a detected value of the current power supply voltage Vs is read.

The motor 6 rotates and drives the wheel steering shaft 8 so as to reduce the difference $\Delta\theta$ between the target steering shaft angular position $\theta'$ and the current steering shaft angular position $\theta$. A rotation speed of the motor 6 is increased if the difference $\Delta\theta$ is large, and is reduced if the difference $\Delta\theta$ is small, such that the steering shaft angular position $\theta$ approaches toward the target steering shaft angular position $\theta'$ promptly and smoothly. Basically, a proportional control using $\Delta\theta$ as a parameter is performed, however, a well-known PID control considering differential or integral of $\Delta\theta$ is preferably performed to suppress overshooting, hunting, and the like to promote control stabilization.

The motor 6 is controlled by PWM as described above, and the rotation speed thereof is adjusted by changing the duty ratio $\eta$. If the power supply voltage Vs is constant, the rotation speed can be adjusted approximately in a one-to-one relationship with the duty ratio. However, in this embodiment, the power supply voltage Vs is not constant as mentioned earlier. Therefore, the duty ratio $\eta$ is determined by also taking into account the power supply voltage Vs. For instance, as shown in FIG. 11, a two-dimensional duty ratio conversion table 131 that offers the duty ratios $\eta$ corresponding to respective combinations of the power supply voltage Vs and the difference $\Delta\theta$ is stored in the ROM 112 (122), so that a value of the duty ratio $\eta$ corresponding to a detected value of the power supply voltage Vs and a calculated value of the difference $\Delta\theta$ can be read and used. Furthermore, a rotation speed of the motor 6 also changes according to a load. In this case, a motor load condition may be presumed based on a detected value of the motor current Is detected by the current sensor 70, and the duty ratio $\eta$ may be corrected and used.

Next, the process proceeds to S209 for a current detection process. In this process, a detected current value of the motor 6 output from the current sensor 70 is read. Then, an overcurrent condition is determined when the detected current value Is exceeds a predetermined value, and the steering wheel shaft 3 and the wheel steering shaft 8 are locked in the same way as described above to stop the motor 6. For example, if the detected current value Is continues to be greater than the predetermined value for a certain period of time or longer, it is determined as the overcurrent condition, and the lock mechanism 19 can be actuated (in this case, the lock state is released if the overcurrent condition is eliminated).

The processes up to this point are performed in both main microcomputer 110 and sub-microcomputer 120 in parallel. For instance, as to whether the main microcomputer 110 is operating normally, calculation results of respective parameters stored in the RAM 113 of the main microcomputer 110 are sent to the sub-microcomputer 120 as necessary, and verified against the stored content in the RAM 123 on the sub-microcomputer 120 side, thereby enabling monitoring of abnormality occurrence. On the other hand, on the main microcomputer 110 side, PWM signals are generated based on the determined duty ratio $\eta$. Then, signals from the rotary encoder that constitutes the steering shaft angle detecting portion 103 are referred to, and the PWM signals are output to FETs (FIG. 7) in the motor driver 18 that switch a phase coil concerning to energization, whereby the PWM control of the motor 6 is performed.

Figure 5:
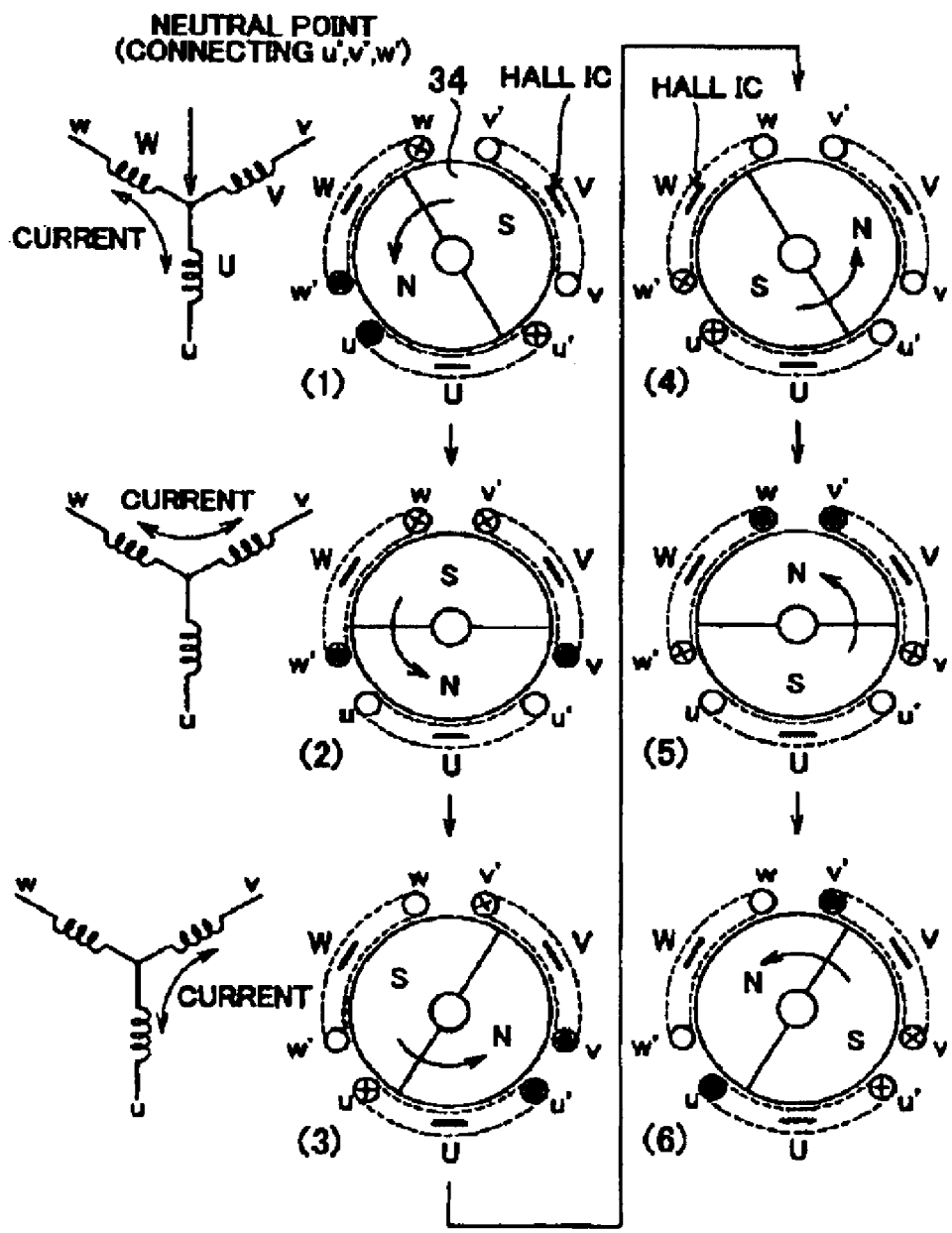
FIG. 5 is an explanatory drawing showing the motion of a three-phase brushless motor used in the embodiment according to the present invention.

Hereinafter, the PWM control of the motor 6 according to the embodiment of the present invention will be described in detail. The motor 6 is constructed by a three-phase brushless motor as mentioned above. The coils 35 and 35 shown in FIG. 2 comprise three phase coils U, V, and W arranged at 120-degree intervals as shown in FIG. 5. Relative angular relationships of these coils U, V, and W and the armature 34 are detected by hall ICs that constitute angle sensors provided in the motor. Then, upon receipt of output from the hall ICs, the motor driver 18 in FIG. 1 sequentially and cyclically switches energization of the coils U, V, and W such as from W→U (1) to U→V (3) and then to V→W (5) as shown in FIG. 5 (this sequence shows the case of forward rotation; and switching is performed in reverse sequence in the case of reverse rotation). FIG. 8(b) shows a energizing sequence of each phase coil in the case of forward rotation (H represents the energized state, while L represents the de-energized state. In the case of reverse rotation, the energizing sequence in the drawing is symmetrically inverted). Numerals in parentheses in the drawing indicate angular positions of the armature 34 for the corresponding numbers in FIG. 5

Figure 7:
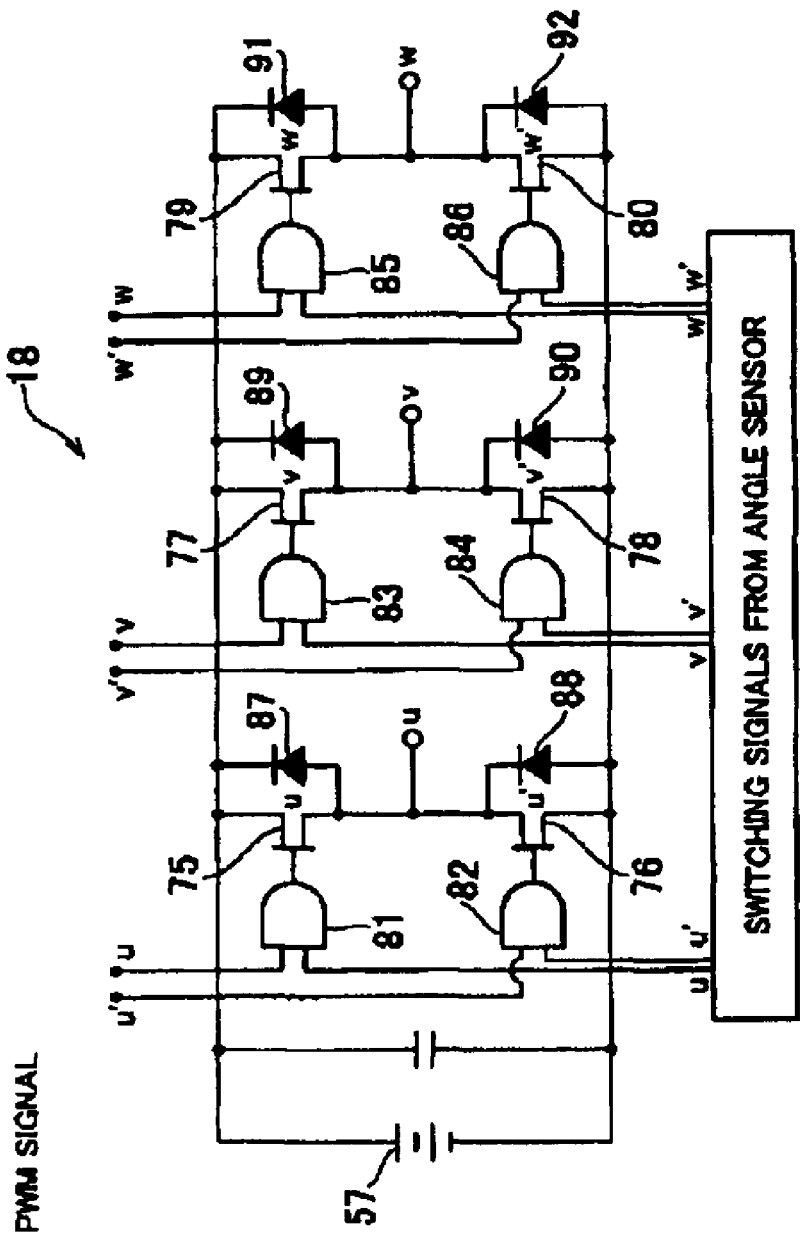
FIG. 7 is a circuit diagram showing an example of a driver portion of the three-phase brushless motor.

Referring back to FIG. 4, the rotation control of the motor 6 is performed with a duty ratio control sequence according to PWM signals from the steering control portion 100 (the main microcomputer 110 in this embodiment) superposed on the sequence of switching energization of the phase coils U, V, and W. FIG. 7 shows an example of a circuit of the motor driver 18, in which FETs (semiconductor switching devices) 75 to 80 corresponding to respective terminals u, u', v, v', w, and w' of the coils U, V, and W are arranged to construct a well-known H-bridge circuit (flywheel diodes 87 to 92 forms a bypass for induced current accompanied with switching of the coils U, V, and W). If a signal representing a logical multiplication of a switching signal from a hall IC (angle sensor) on the motor side with a PWM signal from the steering control portion 100 is generated by AND gates 81 to 86, and if the operation of the FETs 75 to 86 are switched based on such a signal, a phase coil concerning to in energization can be selectively energized by PWM.

In this case, a timing for sequentially sending PWM signals from the steering control portion 100 to the FETs 75 to 80 may be recognized by distributing signals from the hall ICs (angle sensors) to the steering control portion 100. However, in the present embodiment, such a timing is detected using a separate rotary encoder. This rotary encoder detects a rotation angle of the motor output shaft. 36, and a detected angle value has a one-to-one relationship with the angular position of the wheel steering shaft 8 after speed reduction. Therefore, this rotary encoder is used as the steering shaft angle detecting portion 103 in this embodiment.

Figure 8A:
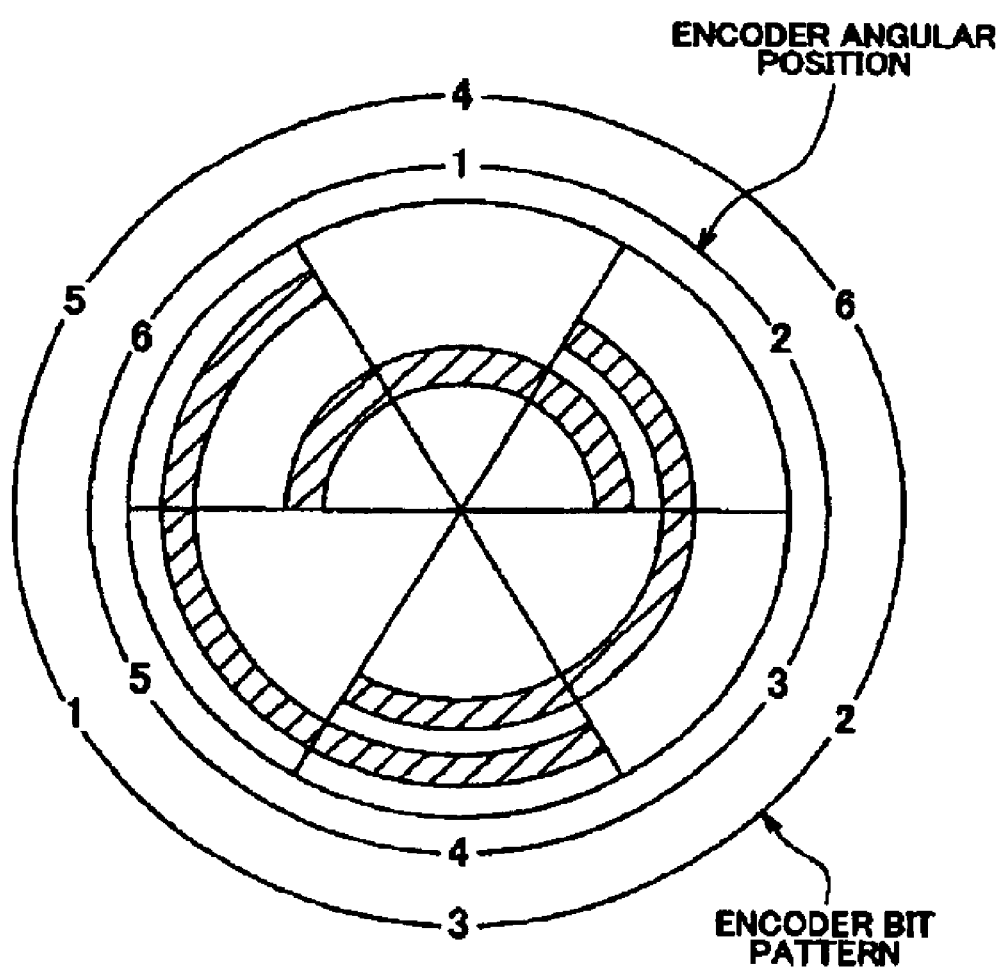
FIG. 8A is an explanatory drawing of a rotary encoder used in the three-phase brushless motor in FIG. 5.
Figure 8B:
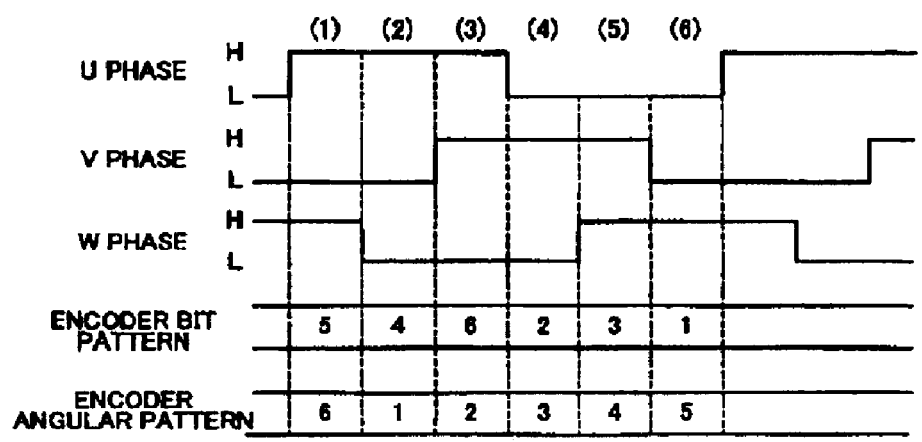
FIG. 8B is an explanatory drawing of a rotary encoder used in the three-phase brushless motor in FIG. 5.

FIG. 8(a) is a schematic view of the aforementioned rotary encoder, in which bit patterns for identifying respective coil energization patterns of which chronological order of appearance is specified are formed at predetermined angular intervals in a circumferential direction of a disc, so as to control the energizing sequence of the brushless motor. Since the three-phase brushless motor is used in the present embodiment, six bit patterns corresponding to the coil energization patterns (1) to (6) (refer to FIG. 5) are formed at 30-degree intervals in the circumferential direction of the disc, such that the energizing sequence for the coils U, V, and W shown in FIG. 8(b) is obtained. Accordingly, if the armature 34 of the motor 6 rotates, the rotary encoder that rotates in synchronization therewith constantly outputs a bit pattern that identifies a coil to be currently energized. The steering control portion 100 reads the bit pattern from the encoder, and thereby can spontaneously determine a coil terminal (that is, the FETs 75 to 80 in FIG. 7) to be supplied with the PWM signal. In addition, in this embodiment, a length of one PWM waveform is set, for instance, to approximately 50 $\mu$s.

Since the rotation of the motor output shaft 36 is reduced and transmitted to the wheel steering shaft 8, the motor output shaft 36 provided with the rotary encoder rotates several times while the wheel steering shaft 8 makes one rotation. Accordingly, an absolute angular position of the wheel steering shaft 8 can not be determined from the bit pattern from the encoder that indicates an absolute angular position of the motor output shaft 36 only. Therefore, as shown in FIG. 4, a counter (steering shaft angular position counter) for counting the number of detection of bit pattern changes is provided in the RAM 113 (123) to determine a steering shaft angular position (θ) from those counts. Thus, the steering shaft angle detecting portion 103 can be regarded as to functionally correspond to an incremental rotary encoder. Furthermore, since the absolute angular position of the motor output shaft 36 can be identified based on the bit patterns, if the sequence of bit pattern change is monitored, a rotation direction of the motor output shaft 36 and thus that of the wheel steering shaft 8 (that is, a direction in which the steering wheel is turned) can be identified. Therefore, the aforementioned counter is incremented in the case of forward rotation of the wheel steering shaft 8, and decremented in the case of reverse rotation.

As described above, respective phase coils U, V, and W are energized in pairs in order of U→V, V→W, and W→U. Each of these phase coils has its one end connected with the other coils and the other end connected to a conducting terminal. Taking the case of energizing pairs of coils U→V as an example, the H-bridge circuit in FIG. 7 has two kinds of power supply connection polarities; one polarity in which a first terminal on the coil U side is connected with a positive pole (first pole) of the DC power supply, and the other polarity in which a second terminal on the coil V side is connected with a positive pole (first pole) of the DC power supply. In the case of the former polarity, a switch u (FET 75) and a switch v' (FET 78) are turned on, and in the case of the latter polarity, a switch u' (FET 76) and a switch v (FET 77) are turned on.

Figure 14:
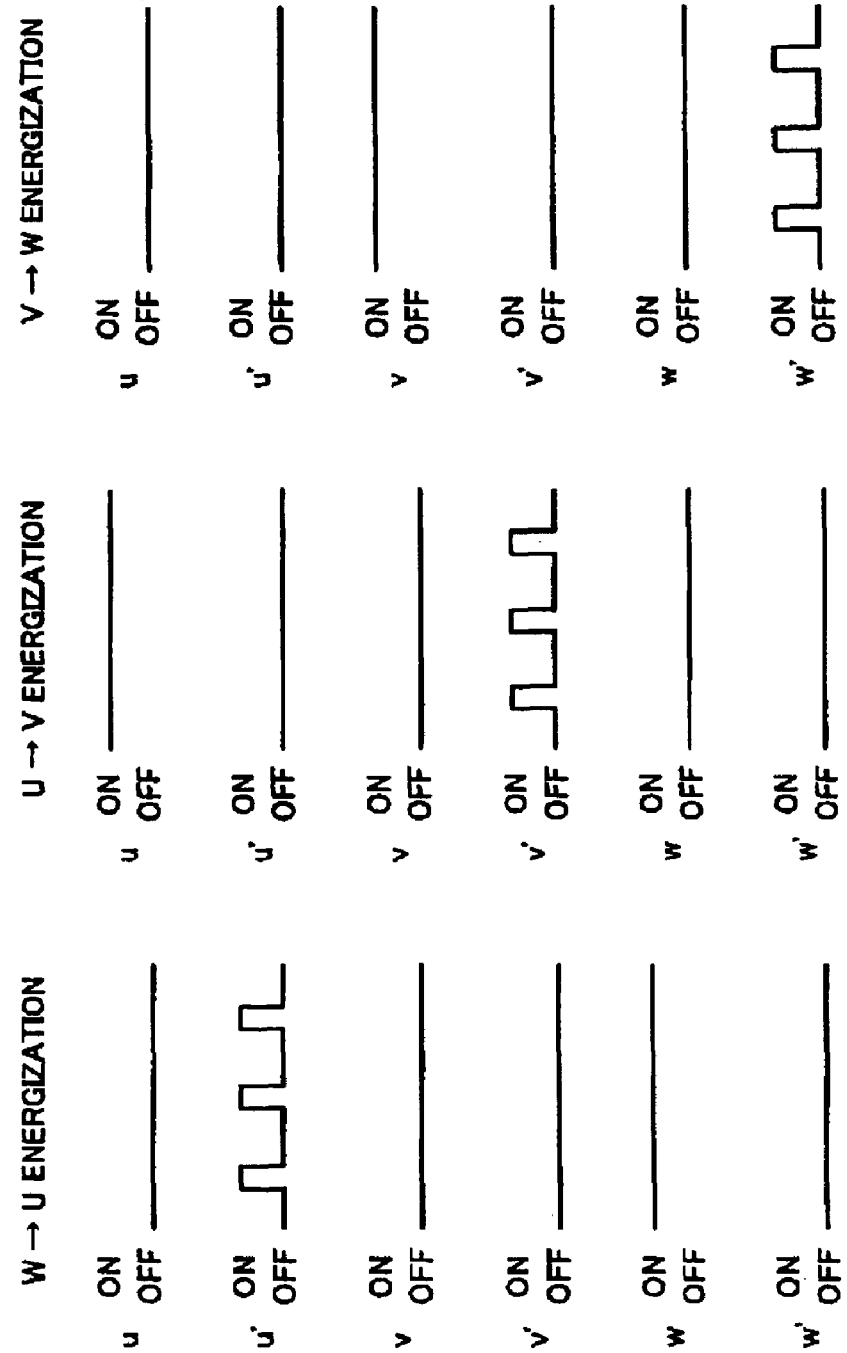
FIG. 14 is a time chart showing an example of a first PWM control method according to the embodiment.

In the present invention, a PWM control method shown in FIG. 14 is used. Specifically, with the polarity of the applied voltage fixed, the polarity switching is not performed in a state in which the first terminal of the pair of coils is connected with the first pole (for example, the positive pole) of the on-board battery (DC power supply) 57, and switching is performed based on the duty ratio η determined in the aforementioned process in a state in which the second terminal is connected to the second pole (for example, the negative pole: a ground connection is also regarded as conceptually equivalent to a negative connection). For example, in a time chart of U→V energization in FIG. 14, the switch u (FET 75) on the coil U side is continuously turned on, while the switch v' (FET 78) on the coil V side is being switched. If the combination of the pair of coils to be energized is changed over in order of U→V, V→W, and W→U, the corresponding switches are sequentially selected and the same switching is performed, as shown in the drawing.

According to this method, as described above in detail, a favorable linearity is obtained in the speed control since no dead time is caused in the switching control. In this case, the terminal voltage during normal operation becomes as follows. Here, energization of U→V is given as an example, in which voltages between terminals of the respective phases are made Vu, Vv, and Vw, and the power supply voltage is made Vs. Since the U-phase is normally ON, the following relationship is established:

$$Vu=Vs \quad (1)$$

Furthermore, since the V-phase is switched based on the duty ratio η, Vv becomes the ground level in the ON state, and becomes equal to the power supply voltage in the OFF state. Accordingly, the following relationship can be established on average:

$$Vv=(1-\eta)Vs \quad (2)$$

Moreover, a ground side of the W-phase that is star-connected with the U-phase and the V-phase is normally open, and therefore, Vw becomes equal to an average voltage level of Vu and Vv, as is expressed by the equation below:

$$Vw=(Vu+Vv)/2 \quad (3)$$

Figure 13:
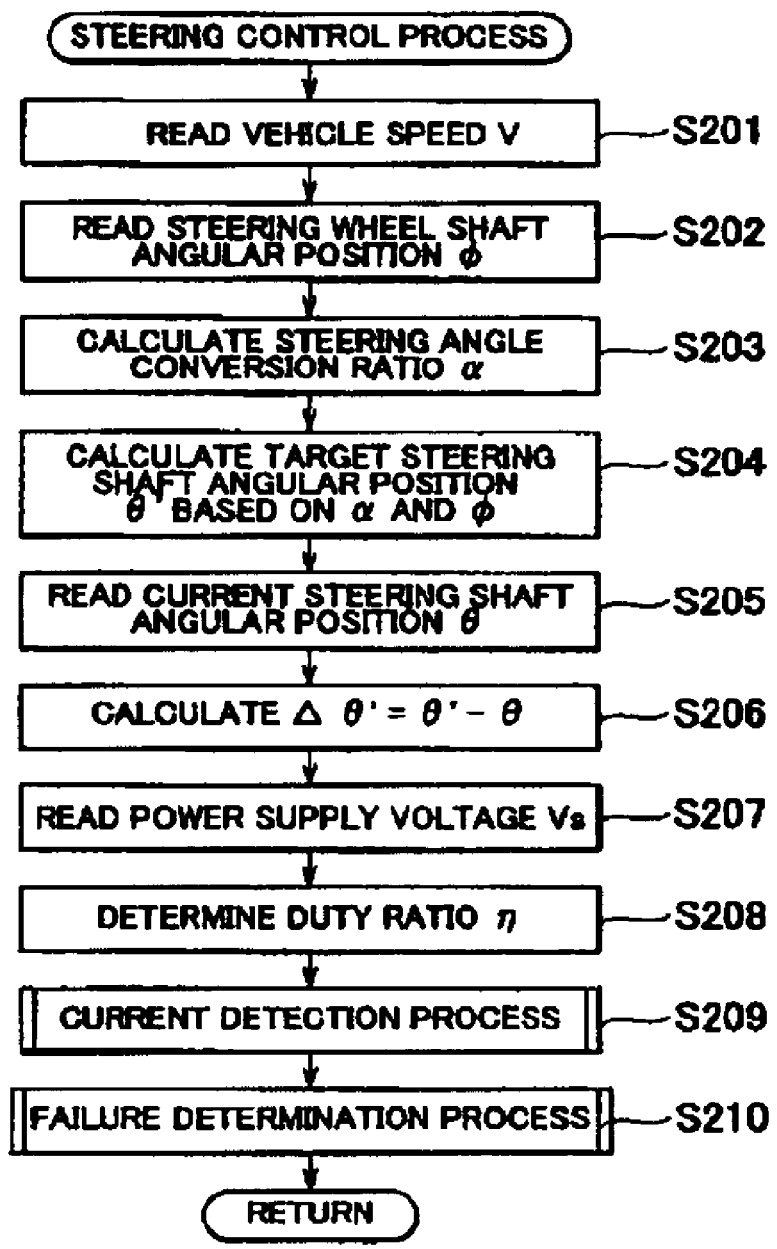
FIG. 13 is a flowchart showing an example of details of a steering control process in FIG. 12.
Figure 15:
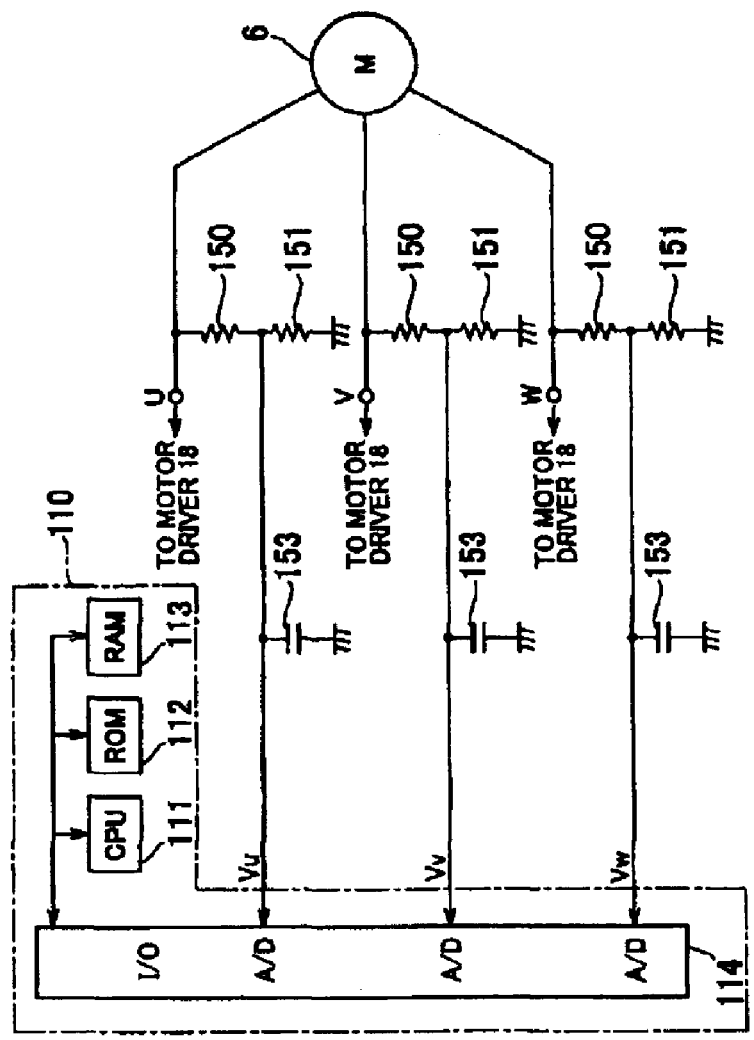
FIG. 15 is an explanatory drawing of a circuit for detecting a terminal voltage of a steering shaft driving motor.

Next, the process proceeds to S210 in FIG. 13 for a failure determination process. A function of the failure determining means that plays the primary role in the failure determination process is achieved with the main CPU 111 (steering control portion 100) running a failure determination program stored in the ROM 112 (the same process may of course be performed on the sub-CPU 122 side as well). Specifically, in FIG. 7, a failure is determined by detecting the voltages of the three phase terminals u, v, and w. As shown in FIG. 15, the voltages of respective terminals u, v, and w are input to the A/D port of the input-output interface 114 of the main microcomputer 110 via voltage-dividing resistors 150 and 151. Meanwhile, since all terminal voltages take the form of intermittent waveforms due to switching, a plurality of adjacent sampling values of terminal voltages are averaged and used in this embodiment. In addition, a signal input line is connected in parallel to a capacitor 153 for noise elimination.

In the present embodiment, the steering shaft driving motor 6 is a three-phase brushless motor, and the detected values of the terminal voltages of the three phase conducting terminals u, v, and w are made Vu, Vv, and Vw, respectively. As indicated in equations (1) to (3) above, if the values when the detected values Vu, Vv, and Vw of the terminal voltages are arranged in order from largest to smallest voltage are made $V_1$, $V_2$, and $V_3$, respectively (provided that $V_1 \geq V_2 \geq V_3$), the following relationship is established based on equation (3) if the motor is in a normal condition:

$$(V_1+V_3)/2=V_2 \quad (4)$$

Although $(V_1+V_3)/2$ rarely completely coincides with $V_2$ due to various error factors, if a certain allowable range is set, $(V_1+V_3)/2$ and $V_2$ may approximately coincide with each other. Therefore, the failure determining means can determine a failure based on results obtained from calculating whether $V_1+V_3$ coincides with $2*V_2$ within a predetermined allowable range.

Figure 16:
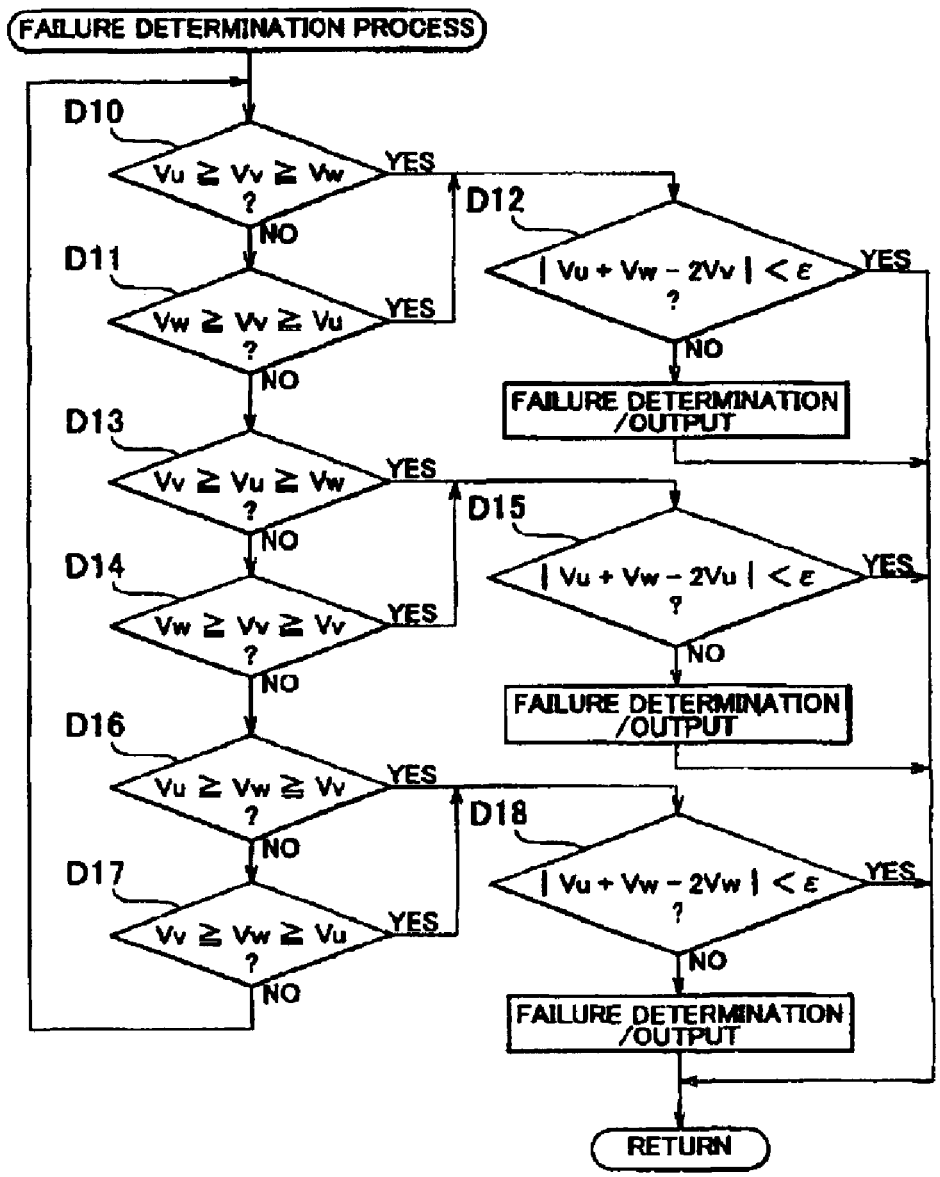
FIG. 16 is a flowchart showing a first example of a failure determination process.

FIG. 16 shows an example of the failure determination process. The outline of this process is that, when the sum of any two values selected from the terminal voltage detection values Vu, Vv, and Vw is made Vm, and the remaining value is made Vr, a calculation is performed for determining whether Vm coincides with 2*Vr within a predetermined range while changing combinations of the two detected values selected for calculation of Vm. When a calculation result in which Vm coincides with 2*Vr is not obtained at all, a failure of the steering shaft driving motor 6 is determined. D10 and D11 assume U→W-phase energization or W→U-phase energization, and D13 and D14 assume V→W-phase energization or W→V-phase energization. Furthermore, D16 and D17 assume U→V-phase energization or V→U-phase energization. Then, by utilizing a certain amount of time that can be secured before the start of next sampling for the failure determination, various conducting phases during sampling are assumed with respect to the combinations of the obtained detected values Vu, Vv, and Vw of the terminal voltages, and calculations are performed by applying the combinations of the detected terminal voltages one after another to the determination calculation patterns (D12, D15, and D18) corresponding to the conducting phases, respectively. The determination calculation pattern is in accordance with equation (4), and is used to determine whether an absolute value of a value obtained by subtracting the double of a terminal voltage of one phase not involved in energization from the sum of terminal voltages of two phases involved in energization, is equal to or less than a threshold value $\epsilon$ representing an allowable range.

In this calculation process, if a result indicating that the value is equal to or less than the threshold value $\epsilon$ is obtained with any one of the conducting phases, it is immediately determined that no abnormality exists, and the failure determination process is completed without particularly performing a failure recovery process. On the contrary, if a result indicating that the value is equal to or less than the threshold value $\epsilon$ is not obtained, a failure is determined and output in any one of D19 to D21. Upon receipt of this result, the steering control portion 100 performs, for example, a process of switching the lock mechanism 19 to the lock state. In this case, in determining whether $V_1+V_3$ coincides with $2*V_2$ within a predetermined allowable range, various alternative algorithms can be applied mathematically in addition to performing a calculation that directly corresponds to equation (4). Any one of these methods may be applied as long as substantively equivalent determination results are obtained. For instance, a method of calculating the ratio of $(V_1+V_3)$ to $2*V_2$ may be used. Since the aforementioned methods allow a failure determination without identifying the conducting phase, a failure can be determined without any problems even by using a multipurpose CPU.

Figure 17:
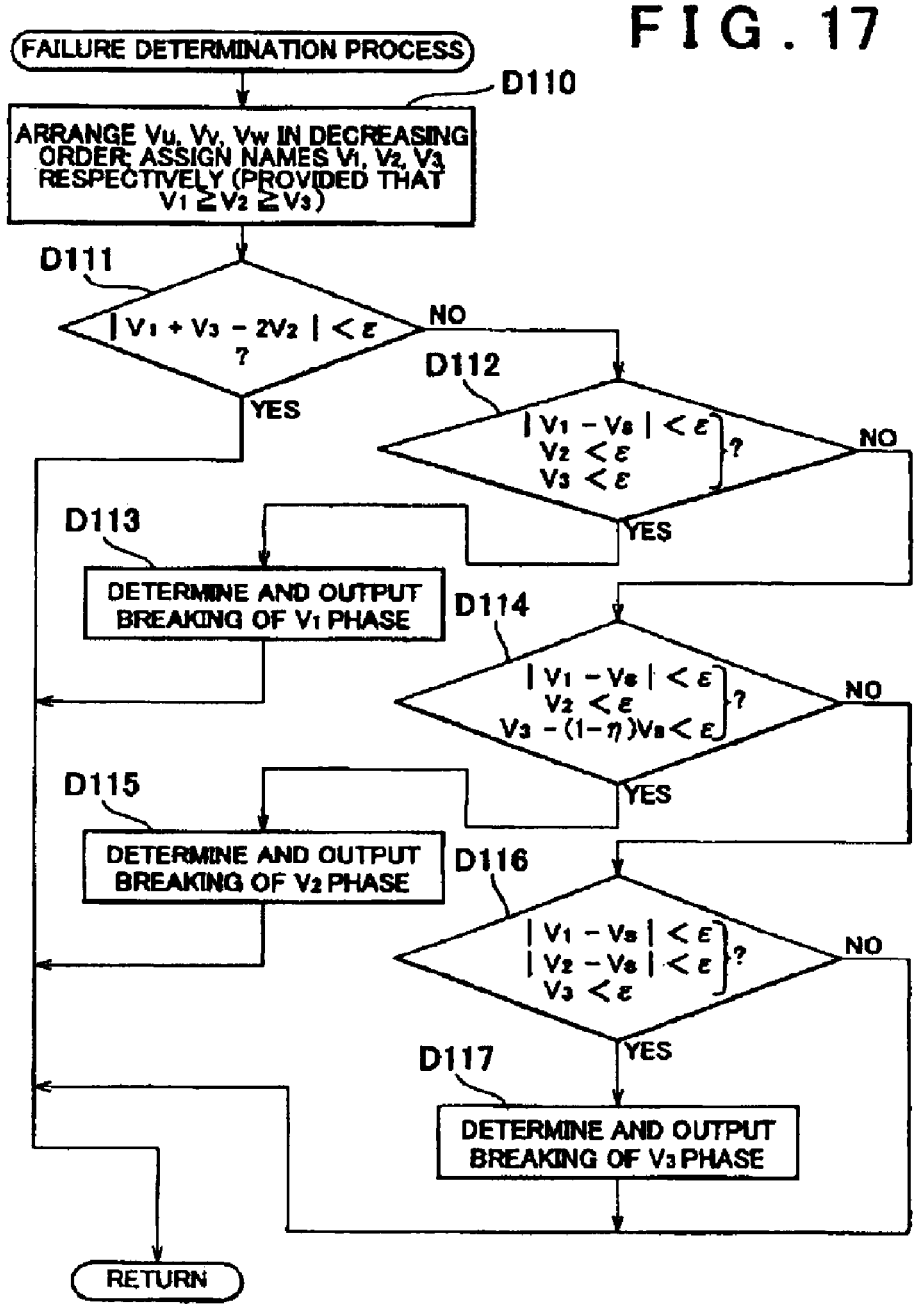
FIG. 17 is a flowchart showing a second example of a failure determination process.

Furthermore, by performing a process of arranging Vu, Vv, and Vw in order from largest to smallest voltage and assign names $V_1$, $V_2$, and $V_3$, respectively (provided that $V_1 \geq V_2 \geq V_3$), it is also possible to determine a failure by performing a calculation process of comparing $V_1+V_3$ and $2*V_2$ only once. Moreover, the determination calculation results may include, in addition to qualitative information concerning the presence of a failure, information with which a failed phase can be identified. By using this information, a process of identifying a failed phase can be performed. FIG. 17 shows an example of a process when a first PWM control method is set. In D110, Vu, Vv, and Vw are arranged in order from largest to smallest voltage, and made $V_1$, $V_2$, and $V_3$, respectively. Then, a determination calculation process according to equation (4) mentioned above is performed in D111. A normal condition is determined if $V_1+V_3$ coincides with $2*V_2$ (within a range of the threshold value $\epsilon$), and therefore, the failure determination process is completed. On the other hand, if $V_1+V_3$ does not coincide with $2*V_2$, the process proceeds to D112 followed by subsequent processes to perform a process of identifying a failed phase. When the terminal voltages of the conducting phases are $V_1$ and $V_3$, if the phase corresponding to $V_1$ is disconnected, the $V_1$ terminal is not changed to a state for receiving electricity from the battery. Accordingly, the value of the terminal voltage $V_1$ becomes equal to a battery voltage Vs. However, since the phase corresponding to $V_3$ and the phase corresponding to $V_2$ connected therewith via the neutral point are disconnected from the phase corresponding to $V_1$ on the battery side due to disconnection, the terminal voltages $V_2$ and $V_3$ become zero. Accordingly, as shown in D112, a calculation is performed to determine if the following relationships are established simultaneously:

$$|V_1 - V_S| < \epsilon \qquad (5)$$

$$V_2 < \epsilon \qquad (6)$$

$$V_3 < \epsilon \qquad (7),$$

where the threshold value is $\epsilon$. If these relationships are established, disconnection of the phase corresponding to $V_1$ is determined and output.

Furthermore, if the phase corresponding to $V_2$ is disconnected, both phases corresponding to $V_1$ and $V_3$ concerning to energization are in a normal condition, and thus, $V_1$ and $V_3$ become Vs and $(1-\eta)$ Vs, respectively, according to equations (1) and (2). However, since the phase corresponding to $V_2$ that assumes the mean value of $V_1$ and $V_3$ in the normal condition is disconnected from the battery due to disconnection, $V_2$ becomes zero. Accordingly, as shown in D114, a calculation is performed to determine if the following relationships are established simultaneously:

$$|V_1 - V_S| < \epsilon \qquad (8)$$

$$V_2 < \epsilon \qquad (9)$$

$$|V_3 - (1-\eta)V_S| < \epsilon \qquad (10),$$

where the threshold value is $\epsilon$. If these relationships are established, disconnection of the phase corresponding to $V_2$ is determined and output.

Moreover, if the phase corresponding to $V_3$ is disconnected, the $V_1$ terminal is not changed to a state for receiving electricity from the battery. Accordingly, the value of the terminal voltage $V_1$ becomes equal to the battery voltage Vs. However, since the phase corresponding to $V_3$ is disconnected from the battery due to disconnection, the terminal voltage becomes zero. Also, $V_2$ that assumes the average value of $V_1$ and $V_3$ in the normal condition will be at the same potential as $V_1$, that is, Vs, because the phase corresponding to $V_3$ is disconnected due to disconnection. Accordingly, as shown in D116, a calculation is performed to determine if the following relationships are established simultaneously:

$$|V_1 - V_S| < \epsilon \qquad (11)$$

$$|V_2 - V_S| < \epsilon \qquad (12)$$

$$V_3 < \epsilon \qquad (13),$$

where the threshold value is $\epsilon$. If these relationships are established, disconnection of the phase corresponding to $V_3$ is determined and output.

Referring back to FIG. 12, it is checked if the ignition switch is turned off in S3, and if the ignition switch is turned off, the process proceeds to S4 for a completion process. That is, if the ignition switch is turned off, that means that the operation of an automobile has been completed. Therefore, the main microcomputer 110 reads a completion angular position of the wheel steering shaft 8 stored in the steering shaft angular position counter to store that position in the EEPROM 115, and furthermore, sets a data writing completion flag provided in the RAM 113 to complete the process.

Obviously, numerous modifications and variations of the present invention are possible in light of the above teachings. It is thereby to be understood that within the scope of the appended claims, the present invention may be practiced otherwise than as specifically described herein.

What is claimed is:

1. A vehicle steering control system that determines a steering angle to be applied to a wheel steering shaft according to an operation angle to be applied to a steering wheel shaft for steering and an operation status of a vehicle, and rotates and drives the wheel steering shaft by a steering shaft driving motor constituted by a three-phase brushless motor so as to obtain the steering angle, comprising:

a steering wheel shaft angle detecting portion for detecting an angular position of the steering wheel shaft, a steering shaft angle detecting portion for detecting an angular position of the wheel steering shaft, an operation status detecting portion for detecting an operation status of the vehicle, a steering control portion for determining a target angular position of the wheel steering shaft based on the detected angular position of the steering wheel shaft and the detected operation status of the vehicle, and controlling a rotation speed of the steering shaft driving motor based on a difference between the angular position of the wheel steering shaft and the target angular position by a PWM control method so as to control an operation of the steering shaft driving motor such that the angular position of the wheel steering shaft approaches toward the target angular position, wherein the PWM control method does not perform switching in a state in which a first terminal is connected to a first pole of a DC power supply, and performs switching in a state in which a second terminal is connected to a second pole of the DC power supply, wherein one of conducting terminals of a pair of two phase coils of the steering shaft driving motor that are simultaneously energized is made the first terminal while the other is made the second terminal, terminal voltage detecting means for separately detecting a terminal voltage of respective phase coil of the steering shaft driving motor, and failure determining means for determining a failure based on results obtained from a calculation performed to determine whether $V_1 + V_3$ coincides with $2*V_2$ within a predetermined allowable range, wherein detected values of the terminal voltages of three phase conducting terminals u, v, and w of the steering shaft driving motor are made Vu, Vv, and Vw, respectively, and values when the detected values Vu, Vv, and Vw are arranged in order from largest to smallest voltage are made $V_1$, $V_2$, and $V_3$, respectively, provided that $V_1 \geq V_2 \geq V_3$.

2. The vehicle steering control system according to claim 1, wherein the failure determining means performs a calculation to determine whether Vm coincides with 2*Vr within a predetermined range, wherein the sum of any two values selected from the detected values Vu, Vv, and Vw of the terminal voltages is made Vm and the remaining value is made Vr, while changing a combination of two detected values selected for calculation of Vm, and determines a failure of the steering shaft driving motor when a calculation result in which Vm coincides with 2*Vr is not obtained.

3. The vehicle steering control system according to claim 1, wherein the steering wheel shaft is mechanically disconnected from the wheel steering shaft, the system further comprising:

a lock mechanism that can be switched between a lock state in which the steering wheel shaft and the wheel steering shaft are connected and locked in an integrally rotatable manner such that a manual operation force applied to the steering wheel shaft is transmitted directly to the wheel steering shaft, and an unlock state in which the connection and locking of the two shafts are released, and lock control means that sets the lock mechanism in the lock state upon receipt of a failure determination result from the failure determining means, and stops the steering shaft driving motor.

4. The vehicle steering control system according to claim 2, wherein the steering wheel shaft is mechanically disconnected from the wheel steering shaft, the system further comprising:

a lock mechanism that can be switched between a lock state in which the steering wheel shaft and the wheel steering shaft are connected and locked in an integrally rotatable manner such that a manual operation force applied to the steering wheel shaft is transmitted directly to the wheel steering shaft, and an unlock state in which the connection and locking of the two shafts are released, and lock control means that sets the lock mechanism in the lock state upon receipt of a failure determination result from the failure determining means, and stops the steering shaft driving motor.

* * * * *